United States Patent
Nishikawa et al.

(10) Patent No.: US 7,534,475 B2
(45) Date of Patent: May 19, 2009

(54) LIQUID CRYSTAL COMPOUND COMPRISING TWO CONDENSED AND SUBSTITUTED RINGS

(75) Inventors: Hideyuki Nishikawa, Minami-ashigara (JP); Ryo Hamasaki, Minami-ashigara (JP); Atsuhiro Ohkawa, Ashigara-kami-gun (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 266 days.

(21) Appl. No.: 10/592,110

(22) PCT Filed: Mar. 8, 2005

(86) PCT No.: PCT/JP2005/004389

§ 371 (c)(1),
(2), (4) Date: Sep. 8, 2006

(87) PCT Pub. No.: WO2005/085222

PCT Pub. Date: Sep. 15, 2005

(65) Prior Publication Data

US 2007/0176145 A1  Aug. 2, 2007

(30) Foreign Application Priority Data

Mar. 8, 2004 (JP) ............................. 2004-064824
Feb. 21, 2005 (JP) ............................. 2005-044769

(51) Int. Cl.
C09K 19/32 (2006.01)
C09K 19/34 (2006.01)
C09K 19/38 (2006.01)
C09K 19/20 (2006.01)
G02F 1/13363 (2006.01)
C07D 277/62 (2006.01)
C07D 307/78 (2006.01)
C07D 333/52 (2006.01)
C07D 493/00 (2006.01)
C07D 495/00 (2006.01)
C07C 69/74 (2006.01)
C07C 69/76 (2006.01)

(52) U.S. Cl. ............ 428/1.31; 252/299.01; 252/299.61; 252/299.62; 252/299.67; 349/117; 548/156; 548/169; 548/525; 549/32; 549/49; 549/50; 549/51; 549/469; 549/470; 549/471; 560/57; 560/80; 560/119

(58) Field of Classification Search ............ 252/299.01, 252/299.61, 299.62, 299.5, 299.67; 428/1.1, 428/1.31; 349/96, 117; 548/156, 169, 525; 549/32, 49, 50, 51, 469, 470, 471; 560/57, 560/80, 119
See application file for complete search history.

(56) References Cited

U.S. PATENT DOCUMENTS 7,169,325 B2 * 1/2007 Nishikawa et al. ..... 252/299.01
2003/0085381 A1 5/2003 Worrall et al.

FOREIGN PATENT DOCUMENTS

| EP | 1300430 | * | 9/2003 |
| JP | 10-068816 A | | 3/1998 |
| JP | 10-090521 A | | 4/1998 |
| JP | 11-052131 A | | 2/1999 |
| JP | 2000-281667 A | | 10/2000 |
| JP | 2000-284126 A | | 10/2000 |
| JP | 2001-004837 A | | 1/2001 |
| JP | 2001-139950 A | | 5/2001 |
| JP | 2002221622 | * | 8/2002 |
| JP | 2002-267838 A | | 9/2002 |
| JP | 2003-176286 A | | 6/2003 |
| WO | WO 00/02675 A1 | | 1/2000 |

OTHER PUBLICATIONS

English translation for JP 2002-221622, http://www4.ipdl.inpit.go.jp/Tokujitu/PAJdetail.ipdl?N0000=60&N0120=01&N2001=2&N3001=2002-221622.*
Replace the reference U cited in pto-892 dated Aug. 26, 2008 as follow: English translation for JP 2002-221622, http:/www4.ipdl.inpit.go.jp/Tokujitu/PAJdetail.ipdl?N0000=60&N0120=01&N2001=2&N3001=2002-221622, 2002.*

* cited by examiner

Primary Examiner—Shean C Wu
(74) Attorney, Agent, or Firm—Buchanan Ingersoll & Rooney PC

(57) ABSTRACT

A new liquid crystal compound comprises two condensed and substituted rings. The ring preferably is a five-membered heterocyclic ring. The heterocyclic ring is preferably condensed with benzene ring or an aromatic six-membered heterocyclic ring. The benzene ring or the aromatic six-membered heterocyclic ring is preferably substituted with a group comprising a cyclic structure and a chain structure. The liquid crystal compound is advantageously used in preparation of a thin phase retarder, such as a wide-ranged λ/4 plate, which gives inverse wavelength distribution. The phase retarder can be easily produced according to a simple process by using the new liquid crystal compound.

10 Claims, No Drawings

LIQUID CRYSTAL COMPOUND COMPRISING TWO CONDENSED AND SUBSTITUTED RINGS

FIELD OF THE INVENTION

The present invention relates to a liquid crystal compound and a liquid crystal composition useful for preparing optical elements such as a phase retarder, an elliptically polarizing plate, a polarization plane-rotator and a PS-converting prism. The invention also relates to a phase retarder and an elliptically polarizing plate advantageously used in an optical analyzer, an optical measuring apparatus, an optical pick-up device, a liquid crystal device of reflection type, a liquid crystal device of semi-transmission type or a liquid crystal device of transmission type.

BACKGROUND OF THE INVENTION

A known phase retarder is, for example, a thin plate made of inorganic material such as calcite, mica or quartz or a stretched film made of polymer having a high specific birefringent index. The phase retarder may be a quarter-wave plate (hereinafter, referred to as "λ/4 plate"), which converts linearly polarized light into circularly polarized light, or a half-wave plate (hereinafter, referred to as "λ/2 plate"), which turns the plane of polarizing oscillation of linearly polarized light by 90°. These conventional phase retarders can delay the phase of mono-chromatic light by λ/4 or λ/2. They, however, convert white light, which is an associated wave composed of mixture of rays in visible wavelength region, into colored polarized light because the polarization depends on the wavelength and hence because the polarization is distributed over the wavelength region. This is essentially caused by the fact that the phase retarder is made of material having characteristics to give wavelength distribution of the phase retardation.

In order to solve the above problem, various wide-ranged phase retarders giving even phase retardation within wide wavelength regions have been studied. For example, Japanese Patent Provisional Publication No. 10(1998)-68816 discloses a phase retarder prepared by laminating a quarter-wave plate, which gives birefringent light having the phase retardation of λ/4, and a half-wave plate, which gives birefringent light having the phase retardation of λ/2, so that their optical axes may be crossed. Further, Japanese Patent Provisional Publication No. 10(1998)-90521 discloses another combined phase retarder prepared by laminating at least two phase-retarders having optical phase retardation values of 160 to 320 nm so that their slow axes may be neither parallel nor perpendicular to each other.

In producing the above phase retarders, however, it is necessary to perform a complicated procedure in which two polymer films are placed with their optical orientations (such as optical axes and slow axes) controlled. The optical orientation of polymer film generally corresponds to the lateral or longitudinal direction of the film in the form of a sheet or a roll. Accordingly, it is difficult to industrially mass-produce a polymer film having the optical axis or slow axis in an oblique direction of the sheet or roll. In addition, the optical orientations of two polymer films must be positioned so that they may be neither parallel nor perpendicular to each other. The process for producing the above phase retarders, therefore, must include the steps of: cutting two polymer films obliquely at a predetermined angle to obtain chips, and laminating the chips. The step of laminating the chips is so difficult that the axes are often improperly positioned and accordingly that the resultant retarder often has poor quality. As a result, the production yield is lowered and hence the production cost increases. Further, in the step, the chips are often contaminated to impair the quality of resultant retarder. Furthermore, it is also difficult to control strictly the optical phase retardation values of the polymer films, and hence the resultant retarder is liable to deteriorate.

Japanese Patent Provisional Publication No. 11(1999)-52131 discloses yet another phase retarder of laminate type giving a wavelength distribution value α of less than 1 and having a laminated structure in which birefringent media A and B are layered so that their slow axes may be perpendicular to each other. At least one of the birefringent media A and B comprises a liquid crystal compound whose molecules are oriented in homogeneous alignment. In the disclosed retarder, the birefringent media A and B satisfy the conditions of:

αA<αB and RA>RB in which αA and αB are wavelength distribution values of birefringent index Δn (α=Δn(450 nm)/Δn(650 nm)) in the birefringent media A and B, respectively; and RA and RB are phase retardations of the media A and B, respectively. Japanese Patent Provisional Publication No. 2000-284126 discloses still another phase retarder comprising two optically anisotropic layers. One of the optically anisotropic layers gives a retardation value of 210 to 300 nm at 550 nm, and the other gives a retardation value of 115 to 150 nm. In addition, one of the optically anisotropic layers is a polymer film, and the other comprises liquid crystal molecules. Japanese Patent Provisional Publication No. 2001-4837 discloses still yet another phase retarder comprising a belt-shaped transparent support and thereon-provided first and second optically anisotropic layers. The first optically anisotropic layer comprises liquid crystal molecules, and gives essentially the phase retardation of π. On the other hand, the second optically anisotropic layer comprises liquid crystal molecules, and gives essentially the phase retardation of π□. The first and second optically anisotropic layers are laminated so that the slow axis in plane of the first anisotropic layer may be essentially at 75° to the longitudinal direction of the support and that the slow axis in plane of the second anisotropic layer may be essentially at 15° to that of the first anisotropic layer. Those disclosed phase retarders are laminates comprising two or more layered birefringent media, and are proposed as wide-ranged λ/4 plates.

Even in producing any of the above phase retarders, although at least one birefringent medium comprises liquid crystal molecules oriented in homogeneous alignment, it is still necessary to laminate the two birefringent media with their slow axes positioned perpendicularly or at a predetermined angle. Accordingly, in the production process, a complicated procedure is still indispensable.

In order to solve this problem, PCT Publication No. 00/2675 discloses a process for producing a wide-ranged λ/4 plate comprising not layered phase retarders but only one phase retarder.

In the disclosed process, a film of a copolymer is uniaxially stretched. The copolymer is derived from monomer units having positive refractive anisotropy and monomer units having negative birefringence. Since the thus-stretched polymer film gives inverse wavelength distribution, a wide-ranged λ/4 plate can be constituted of one phase retarding film. This λ/4 plate can solve the above problem, but its thickness is no less than 100 μm, which is thicker than a phase retarder comprising liquid crystal. Meanwhile, it has been recently wanted to thin a phase retarder installed in a liquid crystal display of reflection type. In view of thickness, therefore, the phase retarder of laminate type is required to be improved.

For the purpose of producing a thin wide-ranged λ/4 plate in a simple process, Japanese Patent Provisional Publication No. 2002-267838 proposes a liquid crystal composition giving inverse wavelength distribution. In preparing the disclosed composition, rod-like crystal molecules are mixed with other molecules capable of orienting themselves perpendicularly to the long axes of the rod-like crystal molecules so that the composition can give inverse wavelength distribution. However, since the molecules mixed with the rod-like crystal molecules are not liquid crystal, the mixture loses characters of liquid crystal when the mixing ratio increases. Accordingly, the wavelength distribution is difficult to control. In other words, it is very difficult to realize inverse wavelength distribution similar to the ideal curve of wide-ranged λ/4 plate. It has been, therefore, desired to develop a technique by which a thin phase retarder, such as a wide-ranged λ/4 plate, giving inverse wavelength distribution can be easily prepared in a simple process.

SUMMARY OF THE INVENTION

An object of the present invention is to provide a new liquid crystal compound and thereby to provide a thin phase retarder, such as a wide-ranged λ/4 plate, which can be easily produced by a simple process and which gives inverse wavelength distribution.

Another object of the invention is to employ the new liquid crystal compound for providing a liquid crystal composition, a polymer, a phase retarder and an elliptically polarizing plate.

The objects of the present invention are achieved by the following.

(1) A liquid crystal compound represented by the following formula (I):

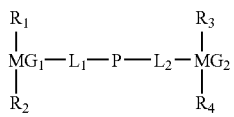

(I)

in which each of $MG_1$ and $MG_2$ is independently a liquid crystal core part which comprises at least 2 and at most 8 cyclic groups and which induces an appearance of liquid crystal phase, and the cyclic groups constituting the liquid crystal core parts may be aromatic rings, aliphatic rings or heterocyclic rings; one of the cyclic groups constituting $MG_1$ and $MG_2$ is substituted with $L_1$ and $L_2$, respectively; $R_1$, $R_2$, $R_3$ and $R_4$ are flexible substituent groups, dipole-effect groups and hydrogen-bonding groups, and are positioned along the long molecular axes of the liquid crystal core parts and induce an appearance of liquid crystal phase; each of $L_1$ and $L_2$ is independently a linking group substituting each of the liquid crystal core parts $MG_1$ and $MG_2$, respectively, and is represented by the following (I)-LA or (I)-LB:

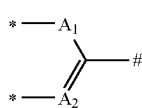

(I)-LA

-continued

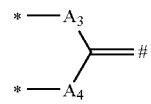

(I)-LB in which * indicates a position where the cyclic group constituting $MG_1$ is substituted; # indicates a position where P is connected; each of $A_1$, $A_3$ and $A_4$ is independently —O—, —NH—, —S—, —CH$_2$—, —CO—, —SO— or —SO$_2$—; and $A_2$ is —CH= or —N=; in the case where $L_1$ and $L_2$ are represented by (I)-LA, the substituent group P is a single bond or a divalent linking group selected from the group consisting of —CH=CH—, —C≡C—, 1,4-phenylene and combinations thereof; in the case where either $L_1$ or $L_2$ is represented by (I)-LB, the substituent group P is represented by *=CH—P$_1$-# or *=N—P$_1$-# (in which * indicates a position where the group represented by (I)-LB is connected, and # indicates a position where the group represented by (I)-LA is connected); $P_1$ is a single bond or a divalent linking group selected from the group consisting of —CH=CH—, —C≡C—, 1,4-phenylene and combinations thereof; in the case where $L_1$ and $L_2$ are represented by (I)-LB, the substituent group P is a double bond or a group represented by =CH—P$_1$—CH=, =N—P$_1$—CH= or =N—P$_1$—N=; and $P_1$ is the same as the above $P_1$.

(2) A liquid crystal composition containing the liquid crystal compound of (1).

(3) A liquid crystal composition containing the liquid crystal compound of (1) and at least one liquid crystal compound giving normal wavelength distribution of Δn.

(4) A phase retarder comprising a transparent support and at least one optically anisotropic layer provided thereon, wherein the optically anisotropic layer is formed from the liquid crystal compound of (1).

(5) An elliptically polarizing plate comprising the phase retarder of (4) and a polarizing membrane.

(6) A polymer prepared from the liquid crystal compound of (1).

(7) A liquid crystal compound forming nematic phase or smectic A phase, wherein the liquid crystal phase satisfies the following formula (II):

$$\Delta n(450\ nm)/\Delta n(550\ nm) < 1.0 \quad (II)$$

in which Δn(λ) means the specific birefringent index at the wavelength λ in the liquid crystal phase.

(8) A liquid crystal composition containing the liquid crystal compound of (7).

(9) A liquid crystal composition containing the liquid crystal compound of (7) and at least one liquid crystal compound giving normal wavelength distribution of Δn.

(10) A phase retarder comprising a transparent support and at least one optically anisotropic layer provided thereon, wherein the optically anisotropic layer is formed from the liquid crystal compound of (7).

(11) An elliptically polarizing plate comprising the phase retarder of (10) and a polarizing membrane.

(12) A polymer prepared from the liquid crystal compound of (7).

(13) A compound represented by the following formula (III):

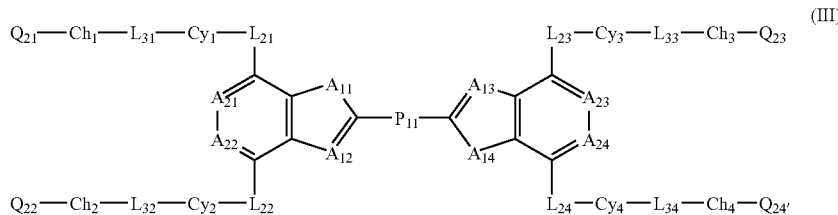

in which each of $A_{11}$ and $A_{14}$ is independently —O—, —NR—, —S—, —CR$_2$—, —CO—, —SO— or —SO$_2$—, wherein R is hydrogen, a halogen atom, cyano, an alkyl group having 1 to 10 carbon atoms or an acyl group having 1 to 10 carbon atoms; each of $A_{12}$, $A_{13}$, $A_{21}$, $A_{22}$, $A_{23}$ and $A_{24}$ is independently —CR= or —N=, wherein R is hydrogen, a halogen atom, cyano, an alkyl group having 1 to 10 carbon atoms or an acyl group having 1 to 10 carbon atoms; $P_{11}$ is a single bond or a divalent linking group selected from the group consisting of —CR=CR—, —CR=N—, —N=CR—, —C≡C—, 1,4-phenylene that can be substituted with a halogen atom, cyano, an alkyl group having 1 to 10 carbon atoms or an acyl group having 1 to 10 carbon atoms and combinations thereof, wherein R is hydrogen, a halogen atom, cyano, an alkyl group having 1 to 10 carbon atoms or an acyl group having 1 to 10 carbon atoms; each of $L_{21}$, $L_{22}$, $L_{23}$ and $L_{24}$ is independently a single bond or a divalent linking group; each of $Cy_1$, $Cy_2$, $Cy_3$ and $Cy_4$ is independently a divalent cyclic group having at least one aromatic, aliphatic or heterocyclic ring; each of $L_{31}$, $L_{32}$, $L_{33}$ and $L_{34}$ is independently a single bond or a divalent linking group; each of $Ch_1$, $Ch_2$, $Ch_3$ and $Ch_4$ is independently a divalent chain group selected from the group consisting of an alkylene group, a substituted alkylene group, an alkenylene group, a substituted alkenylene group, an alkynylene group and a substituted alkynylene group; and each of $Q_{21}$, $Q_{22}$, $Q_{23}$ and $Q_{24}$ is independently hydrogen or a polymerizable group.

(14) The compound of (13), wherein the compound is a liquid crystal compound forming nematic phase or smectic A phase, and wherein the liquid crystal phase satisfies the following formula (II):

$$\Delta n(450\ nm)/\Delta n(550\ nm)<1.0 \tag{II}$$

in which $\Delta n(\lambda)$ means the specific birefringent index at the wavelength $\lambda$ in the liquid crystal phase.

(15) A liquid crystal composition containing the compound of (13).

(16) A liquid crystal composition containing the compound of (13) and at least one liquid crystal compound giving normal wavelength distribution of $\Delta n$.

(17) A phase retarder comprising a transparent support and at least one optically anisotropic layer provided thereon, wherein the optically anisotropic layer is formed from the compound of (13).

(18) An elliptically polarizing plate comprising the phase retarder of (17) and a polarizing membrane.

(19) A polymer prepared from the compound of (13).

The liquid crystal compound and the liquid crystal composition provided by the invention give inverse wavelength distribution. Further, in the invention, the inverse wavelength distribution-giving liquid crystal composition is used in a polymer, a phase retarder and an elliptically polarizing plate.

DETAILED DESCRIPTION OF THE INVENTION

A liquid crystal compound normally does not give the wavelength distribution of $\Delta n$ satisfying the following formula (II):

$$\Delta n(450\ nm)/\Delta n(550\ nm)<1.0. \tag{Formula (II):}$$

In order to realize the above wavelength distribution $\Delta n$, it is necessary to control at least two absorption wavelengths and transition moments adequately. Since $\Delta n$ is obtained by subtracting the refractive index of normal light from that of abnormal light, it satisfies the formula (II) when the wavelength distribution of refractive index of normal light is smaller than that of abnormal light within a longer wavelength region. If the absorption in the direction of normal light is increased in a longer wavelength region, the wavelength distribution of normal light can be lowered within that wavelength region because the wavelength distribution of refractive index closely relates to absorption of the substance (this fact is indicated by the formula of Lorentz-Lorenz). In this way, a molecule having $\Delta n$ satisfying the formula (II) can be designed.

In a rod-like liquid crystal molecule, for example, the direction of normal light is identical with the lateral direction of the molecule. However, the wavelength where absorbing transition in the lateral direction occurs is very difficult to shift to a longer wavelength region. Although the wavelength of absorbing transition can be normally shifted to a longer wavelength region by enlarging the π-conjugated system in the molecule, the molecule having the enlarged π-conjugated system has such a large width that it no longer behaves as liquid crystal. In order to prevent the molecule from losing the characters of liquid crystal, it is proposed by William N. Thurms et al. (in Liquid Crystals, vol. 25, pp. 149, 1998) to combine two rod-like liquid crystal molecules side-by-side. In the thus-formed structure, the two rod-like liquid crystal molecules are combined through an ethynyl group, whose π-bonding is conjugated with the π-conjugated system of benzene rings in the rod-like liquid crystal molecules. As a result, a tolan structure is formed and the wavelength of absorption in the lateral direction can be shifted to a longer wavelength region without losing the characters of liquid crystal. However, the tolan structure inclines to the long axis of the molecule (to the direction of optical axis) at only about 60°, and this means that the direction of absorbing transition inclines at only about 60°. Accordingly, not only the absorption wavelength of normal light but also that of abnormal light is shifted to a longer wavelength region, and consequently the wavelength distribution is improved little. This is concretely shown later in Comparison Example 2.

The inventors have found that, in order to decrease only the wavelength distribution of normal light in a longer wavelength region, it is necessary to incline the direction of absorbing transition at an angle of preferably 70 to 90°, more preferably 80 to 90° to the long axis of the molecule (to the direction of optical axis). The closer to 90° the inclined angle is, the less the light in the direction of abnormal light is absorbed. Accordingly, since only the wavelength distribution of normal light is decreased in a longer wavelength region, the inclined angle is preferably as close to 90° as possible. As described above, the absorbing transition contributing to the refractive index of normal light preferably occurs in a longer wavelength region than that contributing to the refractive index of abnormal light. Further, the direction of absorbing transition contributing to the refractive index of normal light preferably inclines at an angle of 70 to 90° to the long axis of the molecule (to the direction of optical axis). It is also found that, in order to incline the direction of absorbing transition contributing to the refractive index of normal light at an angle of 70 to 90° to the long axis of the molecule (to the direction of optical axis), the molecule preferably comprises a partial structure in which a six-membered ring is condensed with another ring consisting of an odd number of members (for example, three-, five-, seven- or nine-membered ring). A compound represented by the following formula (I), in which a six-membered ring is condensed with a five-membered ring, is particularly preferred.

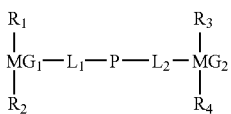

(I)

In the formula (I), each of $MG_1$ and $MG_2$ is independently a liquid crystal core part which comprises at least 2 and at most 8 cyclic groups and which induces an appearance of liquid crystal phase. The liquid crystal core part has a rigid structure comprising a cyclic moiety and a linking moiety, and is necessary for the compound to behave as liquid crystal. The liquid crystal core part is described in "Liquid Crystal Handbook 3.2.2 (written in Japanese)", published by Maruzen.

The cyclic groups may be aromatic rings, aliphatic rings or heterocyclic rings. Examples of the aromatic rings include benzene ring and naphthalene ring. Examples of the aliphatic rings include cyclohexane ring. Examples of the heterocyclic rings include pyridine ring, pyrimidine ring, thiophene ring, 1,3-dioxane ring and 1,3-dithian ring.

The cyclic group containing benzene ring is preferably 1,4-phenylene. The cyclic group containing naphthalene ring is preferably naphthalene-1,5-diyl or naphthalene-2,6-diyl. The cyclic group containing cyclohexane ring is preferably 1,4-cyclohexylene. The cyclic group containing pyridine ring is preferably pyridine-2,5-diyl. The cyclic group containing pyrimidine ring is preferably pyrimidine-2,5-diyl. The cyclic group containing thiophene ring is preferably thiophene-2,5-diyl. The cyclic group containing 1,3-dioxane ring is preferably 1,3-dioxylene-2,5-diyl. The cyclic group containing 1,3-dithian ring is preferably 1,3-dithianylene-2,5-diyl.

Examples of the linking group include a single bond, —CH$_2$—CH$_2$—, —CH$_2$—O—, —CH=CH—, —C≡C—, —CH=N—, —N=N—, —CO—O—, —CO—NH—, —CO—S—, and —CH=CH—CO—O—.

The above-described liquid crystal core part is described in, for example, "Liquid Crystal Handbook (written in Japanese)", Chapter 3, published by Maruzen (2000); "Handbook of Liquid Crystal Device (written in Japanese)", Chapter 3, published by Nikkan Kogyo Shinbunsha (1989); "Liquid Crystal Material (written in Japanese)", Chapter 4, published by Kodansha Ltd. (1991); "Quarterly Chemical Review (written in Japanese)", chapters 1 to 7, published by Japan Chemical Society (1994); and "Handbook of Liquid Crystals", vol. 2A and 2B, by Wiley-VCH (1998). The liquid crystal core part of liquid crystal compound giving nematic phase is particularly preferred.

Examples of $MG_1$ and $MG_2$ are shown below. In the following examples, ** indicates the position where $R_1(R_3)$ or $R_2(R_4)$ is connected.

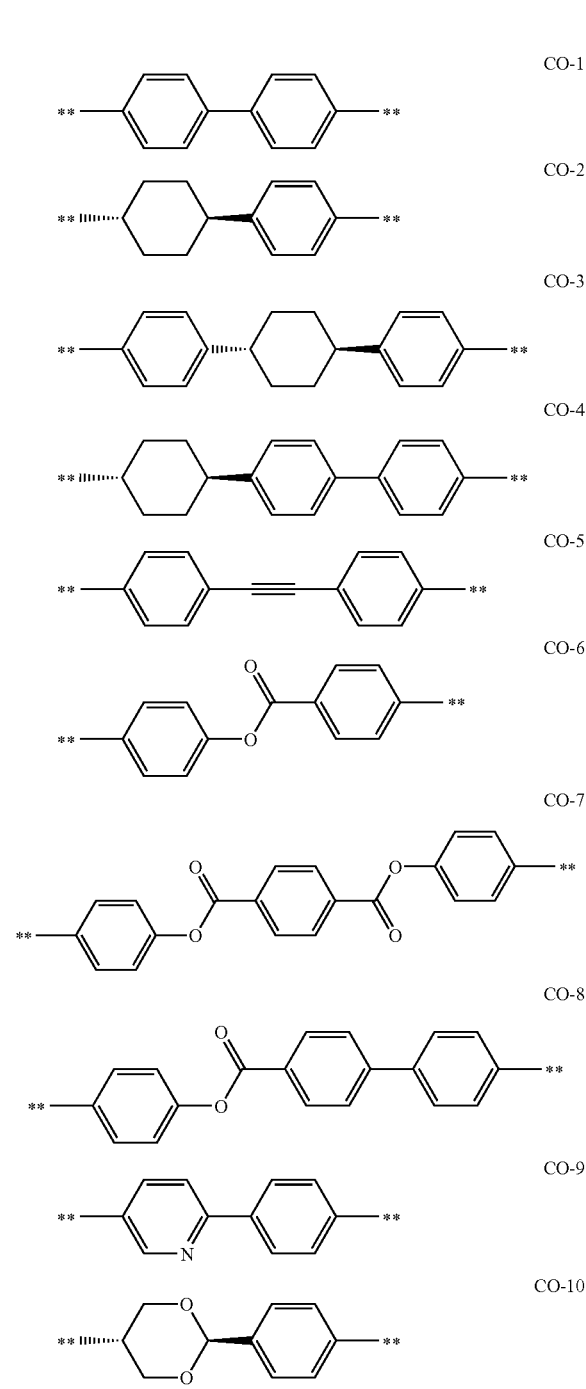

-continued

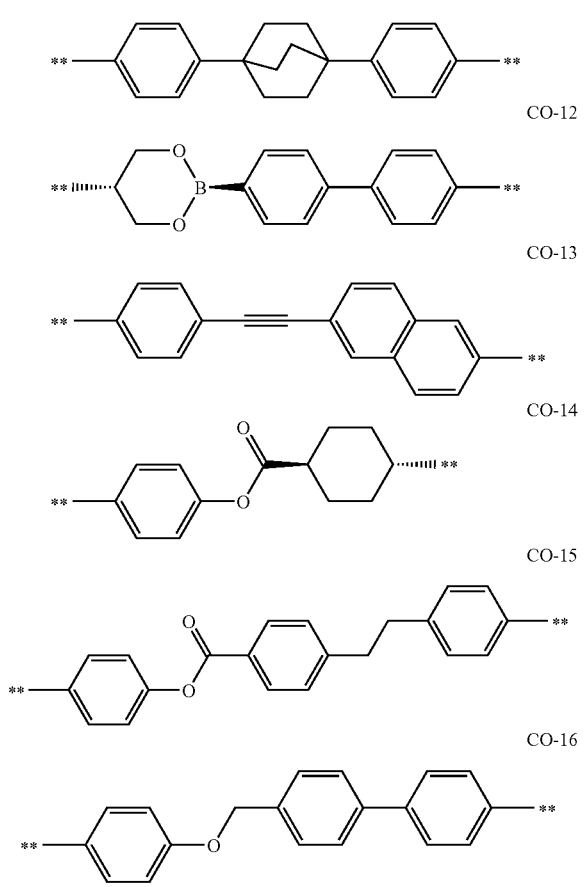

CO-11

CO-12

CO-13

CO-14

CO-15

CO-16

One of the cyclic groups constituting $MG_1$ and $MG_2$ is substituted with $L_1$ and $L_2$, respectively.

Each of $L_1$ and $L_2$ is independently a linking group substituting each of the liquid crystal core parts $MG_1$ and $MG_2$, respectively, and is represented by the following (I)-LA or (I)-LB:

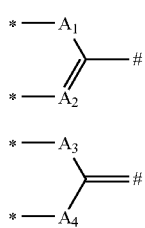

(I)-LA (I)-LB

In the above formulas, * indicates a position where the cyclic group constituting $MG_1$ or $MG_2$ is substituted.

In the above formulas, # indicates a position where P is connected. Each of $A_1$, $A_3$ and $A_4$ is independently —O—, —NH—, —S—, —CH$_2$—, —CO—, —SO— or —SO$_2$—. In the case where each of $A_1$, $A_3$ and $A_4$ is —NH— or —CH$_2$—, the hydrogen atoms may be replaced with other substituent groups. Examples of the substituent groups include a halogen atom, an alkyl group having 1 to 10 carbon atoms, an acyl group having 1 to 10 carbon atoms, and cyano. $A_1$ is preferably —O—, —NH—, —S— or —CH$_2$—, more preferably —O— or —CH$_2$—. Each of $A_3$ and $A_4$ is preferably —O—, —NH—, —S—, —CO—, —SO— or —SO$_2$—, more preferably —O—, —NH—, —S— or —CO—.

In the above formulas, $A_2$ is —CH= or —N=. In the case where $A_2$ is —CH=, the hydrogen atom may be replaced with another substituent group. Examples of the substituent group include a halogen atom, an alkyl group having 1 to 10 carbon atoms, an acyl group having 1 to 10 carbon atoms, and cyano.

In the case where $L_1$ and $L_2$ are represented by (I)-LA, the substituent group P is a single bond or a divalent linking group selected from the group consisting of —CH=CH—, —C≡C—, 1,4-phenylene and combinations thereof. However, if some unfavorable combinations are used as P, the absorption is so shifted that the compound is colored in yellow. Accordingly, it is necessary to select the linking group properly. In the above, P is preferably a single bond, —CH=CH—, —CH=CH—CH=CH—, —CH=CH—C≡C—, —C≡C—, —C≡C—C≡C— or 1,4-phenylene, more preferably a single bond, —CH=CH—, —C≡C—, —C≡C—C≡C— or 1,4-phenylene. In the case where P contains —CH=CH— or 1,4-phenylene, the methine group may be replaced with nitrogen atom and the hydrogen atoms in —CH=CH— or 1,4-phenylene may be replaced with other substituent groups. Examples of the substituent groups include a halogen atom, an alkyl group having 1 to 10 carbon atoms, an acyl group having 1 to 10 carbon atoms, and cyano.

In the case where either $L_1$ or $L_2$ is represented by (I)-LB, the substituent group P is represented by *=CH—P$_1$-# or *=N—P$_1$-# (in which * indicates a position where the group represented by (I)-LB is connected, and # indicates a position where the group represented by (I)-LA is connected). In the formula, $P_1$ is a single bond or a divalent linking group selected from the group consisting of —CH=CH—, —C≡C—, 1,4-phenylene and combinations thereof. If some unfavorable combinations are used as $P_1$, the absorption is so shifted that the compound is colored in yellow. Accordingly, it is necessary to select the linking group properly. In the above, $P_1$ is preferably a single bond, —CH=CH—, —CH=CH—CH=CH—, —CH=CH—C≡C—, —C≡C—, —C≡C—C≡C— or 1,4-phenylene, more preferably a single bond, —CH=CH—, —C≡C—, —C≡C—C≡C— or 1,4-phenylene. In the case where $P_1$ contains —CH=CH— or 1,4-phenylene, the methine group may be replaced with nitrogen atom and the hydrogen atoms in —CH=CH— or 1,4-phenylene may be replaced with other substituent groups. Examples of the substituent groups include a halogen atom, an alkyl group having 1 to 10 carbon atoms, an acyl group having 1 to 10 carbon atoms, and cyano.

In the case where $L_1$ and $L_2$ are represented by (I)-LB, the substituent group P is a double bond or a group represented by =CH—P$_1$—CH=, =N—P$_1$—CH= or =N—P$_1$—N=. Here, $P_1$ is the same as the above $P_1$.

Examples of $MG_1$ and $MG_2$ substituted with $L_1$ and $L_2$, respectively, are shown below. In the following examples, ** indicates the position where $R_1(R_3)$ or $R_2(R_4)$ is connected and # indicates the position where P is connected.

COL-1
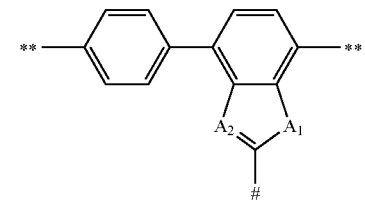
COL-2
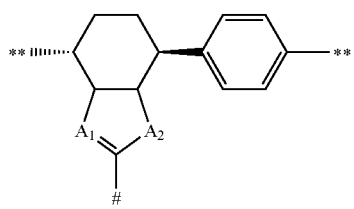
COL-3
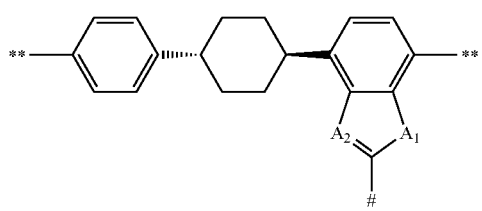
COL-4
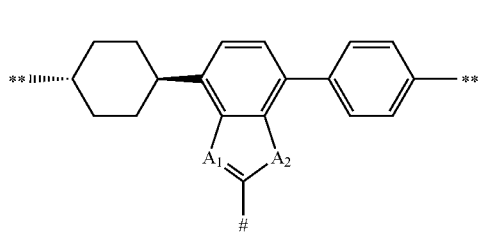
COL-5
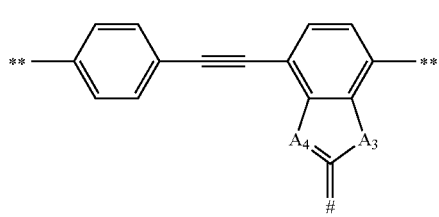
COL-6
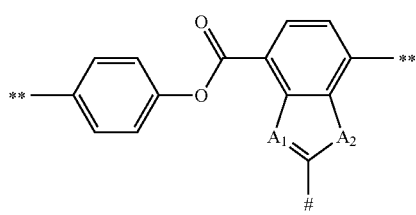
COL-7
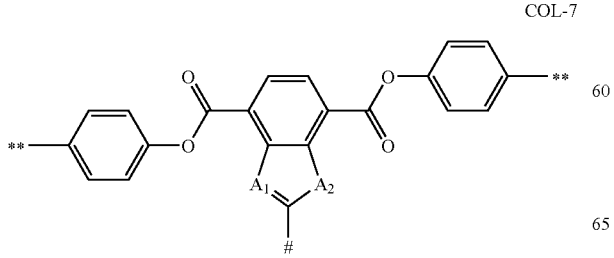
-continued
COL-8
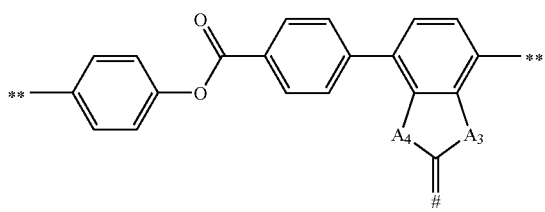
COL-9
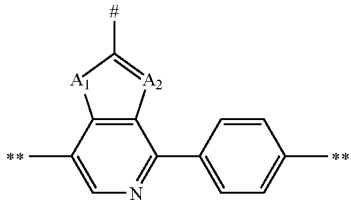
COL-10
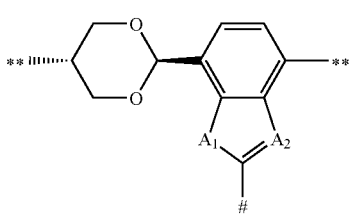
COL-11
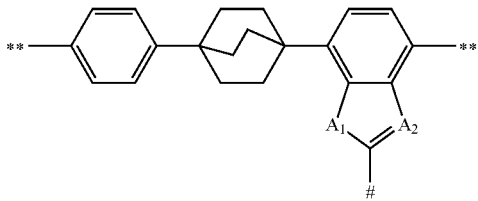
COL-12
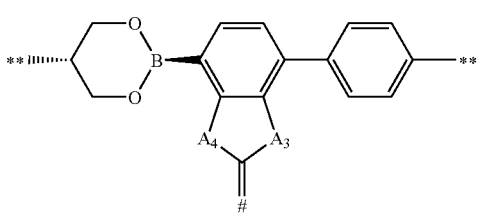
COL-13
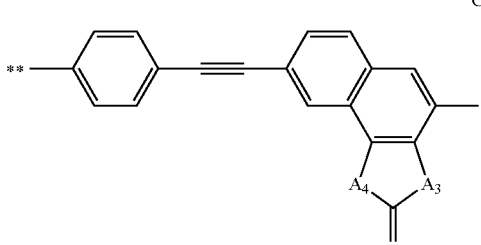
COL-14
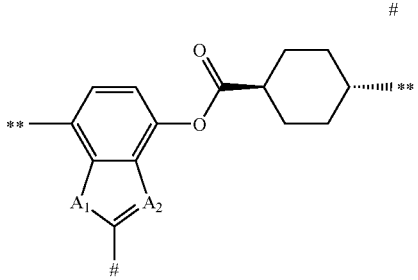

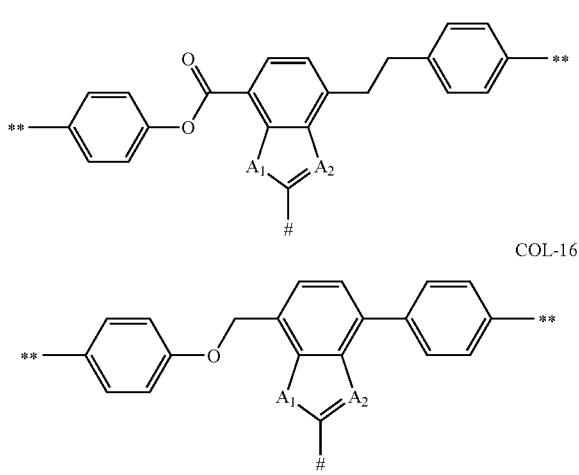

The cyclic groups constituting $MG_1$ and $MG_2$ may have substituent groups other than $L_1$ and $L_2$. Examples of the substituent groups include a halogen atom, cyano, nitro, an alkyl group having 1 to 5 carbon atoms, a halogen-substituted alkyl group having 1 to 5 carbon atoms, an alkoxy group having 1 to 5 carbon atoms, an alkylthio group having 1 to 5 carbon atoms, an acyloxy group having 2 to 6 carbon atoms, an alkoxycarbonyl group having 2 to 6 carbon atoms, carbamoyl, an alkyl-substituted carbamoyl group having 2 to 6 carbon atoms, and an acylamino group having 2 to 6 carbon atoms.

In the formula (I), $R_1$, $R_2$, $R_3$ and $R_4$ are flexible substituent groups, dipole-effect groups and hydrogen-bonding groups. They are positioned along the long molecular axes of the liquid crystal core parts, and induce an appearance of liquid crystal phase. Examples of the flexible substituent groups include: an alkyl group having 1 to 20 carbon atoms, an alkoxy group having 1 to 20 carbon atoms, an acyl group having 2 to 20 carbon atoms, an alkoxycarbonyl group having 2 to 20 carbon atoms, an acyloxy group having 2 to 20 carbon atoms, an alkoxycarbonyloxy group having 2 to 20 carbon atoms, an alkylthio group having 1 to 20 carbon atoms, an amino group having 1 to 20 carbon atoms, an acylamino group having 2 to 20 carbon atoms, and an alkoxycarbonylamino group having 2 to 20 carbon atoms. These flexible substituent groups may be further substituted with other substituent groups. Examples of the substituent groups include: an alkyl group (e.g., methyl, ethyl, isopropyl, tert-butyl), an alkenyl group (e.g., vinyl, allyl, 2-butenyl, 3-pentenyl), an alkynyl group (e.g., propargyl, 3-pentynyl), an aryl group (e.g., phenyl, p-methylphenyl, naphthyl), a substituted or non-substituted amino group (e.g., non-substituted amino, methylamino, dimethylamino, diethylamino, anilino), an alkoxy group (e.g., methoxy, ethoxy, butoxy), an aryloxy group (e.g., phenyloxy, 2-naphthyloxy), an acyl group (e.g., acetyl, benzoyl, formyl, pivaloyl), an alkoxycarbonyl group (e.g., methoxycarbonyl, ethoxycarbonyl), an aryloxy-carbonyl group (e.g., phenyloxycarbonyl), an acyloxy group (e.g., acetoxy, benzoyloxy), an acylamino group (e.g., acetylamino, benzoylamino), an alkoxycarbonylamino group (e.g., methoxycarbonylamino), an aryloxycarbonylamino group (e.g., phenyloxycarbonylamino), an alkylsulfonylamino group (e.g., methanesulfonylamino), an arylsulfonylamino group (e.g., benzenesulfonylamino), a sulfamoyl group (e.g., sulfamoyl, N-methylsulfamoyl, N,N-dimethylsulfamoyl, N-phenylsulfamoyl), a carbamoyl group (e.g., non-substituted carbamoyl, N-methylcarbamoyl, N,N-diethylcarbamoyl, N-phenylcarbamoyl), an alkylthio group (e.g., methylthio, ethylthio), an arylthio group (e.g., phenylthio), an alkylsulfonyl group (e.g., mesyl), an arylsulfonyl group (e.g., tosyl), an alkylsulfinyl group (e.g., methane-sulfinyl), an arylsulfinyl group (e.g., benzenesulfinyl), an ureido group (e.g., non-substituted ureido, 3-methyl-ureido, 3-phenylureido), a phosphoric amido group (diethyl phosphoric amido, phenyl phosphoric amido), hydroxyl, mercapto, a halogen atom (e.g., fluorine, chlorine, bromine, iodine), cyano, sulfo, carboxyl, nitro, a hydroxamic acid group, sulfino, hydrazino, imino, a hetrocyclic group containing, for example, a heteroatom such as nitrogen, oxygen or sulfur (e.g., imidazolyl, pyridyl, quinolyl, furyl, piperidyl, morpholino, benzoxazolyl, benzimidazolyl, benzthiazolyl), and a silyl group (e.g., trimethylsilyl, triphenylsilyl). These substituent groups may be further-more substituted with themselves.

Examples of the dipole-effect groups include a halogen atom, cyano and nitro. Examples of the hydrogen-bonding groups include carboxyl and hydroxyl.

It is necessary to control (i) the wavelength and strength of absorption caused by the liquid crystal core parts of $MG_1$ and $MG_2$, which mainly absorb abnormal light, and (ii) the wavelength and strength of lateral absorption caused by -$L_1$-P-$L_2$- and the cyclic groups constituting $MG_1$ and $MG_2$, which mainly absorb normal light, so that the compound of the formula (I) may give the wavelength distribution of Δn satisfying the formula (II). In other words, in order that the wavelength distribution of refractive index of normal light may decrease more than that of abnormal light in a longer wavelength region, the absorption (ii) must occur at a longer wavelength than the absorption (i). Although the strength of absorption is also an important factor relating to the wavelength distribution, the refractive indexes of normal and abnormal light depend on delicate balance between the absorption wavelength and the absorption strength. In addition, it is difficult to measure experimentally the absorption wave-length and strength of normal and abnormal light. Both of them are, therefore, very difficult to define numerically. According to empirical knowledge, however, the maximum of the absorption (i) is positioned preferably at a wavelength shorter than 320 nm, more preferably at a wavelength shorter than 300 nm. The maximum of the absorption (ii) is positioned preferably at a wavelength longer than 280 nm, more preferably at a wavelength longer than 300 nm. If the absorption (ii) is shifted to a longer wavelength too much, the product is colored in, for example, yellow. The absorption (ii), therefore, preferably does not tail to a wavelength longer than 400 nm. The interval between the maximum peaks of the absorptions (i) and (ii) is preferably not less than 20 nm, more preferably not less than 40 nm. The largest absorption coefficient of (ii) is preferably 0.1 times or more, more preferably 0.2 times or more as large as that of (i). Actually, however, it is often impossible to measure the wavelength and strength of absorptions (i) and (ii), and further side-absorption peaks are often observed. The preferred conditions described above are, therefore, not always usable.

The compound represented by the following formula (III) is particularly referred.

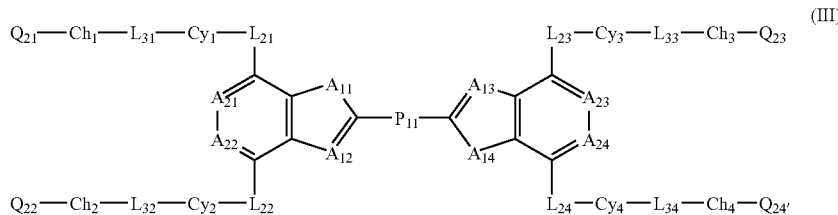

In the formula (III), each of $A_{11}$ and $A_{14}$ is independently —O—, —NR—, —S—, —$CR_2$—, —CO—, —SO— or —$SO_2$—. R is hydrogen, a halogen atom, cyano, an alkyl group having 1 to 10 carbon atoms or an acyl group having 1 to 10 carbon atoms. Each of $A_{11}$ and $A_{14}$ is preferably —O—, —NH—, —S— or —$CH_2$—, and more preferably —O— or —$CH_2$—.

In the formula (III), each of $A_{12}$, $A_{13}$, $A_{21}$, $A_{22}$, $A_{23}$ and $A_{24}$ is independently —CR═ or —N═. R is hydrogen, a halogen atom, cyano, an alkyl group having 1 to 10 carbon atoms or an acyl group having 1 to 10 carbon atoms. Each of $A_{12}$, $A_{13}$, $A_{21}$, $A_{22}$, $A_{23}$ and $A_{24}$ is preferably —CH═ or —N═. Each of $A_{21}$, $A_{22}$, $A_{23}$ and $A_{24}$ is more preferably —CH═.

In the formula (III), $P_{11}$ is a single bond or a divalent linking group selected from the group consisting of —CR═CR—, —CR═N—, —N═CR—, —C≡C—, 1,4-phenylene and combinations thereof. R is hydrogen, a halogen atom, cyano, an alkyl group having 1 to 10 carbon atoms or an acyl group having 1 to 10 carbon atoms. 1,4-phenylene can be substituted with a halogen atom, cyano, an alkyl group having 1 to 10 carbon atoms or an acyl group having 1 to 10 carbon atoms. $P_{11}$ is preferably a single bond, —CH═CH—, —CH═CH—CH═CH—, —CH═CH—C≡C—, —C≡C—, —C≡C—C≡C— or 1,4-phenylene, and more preferably a single bond, —CH═CH—, —C≡C—, —C≡C—C≡C— or 1,4-phenylene.

In the formula (III), each of $L_{21}$, $L_{22}$, $L_{23}$ and $L_{24}$ is independently a single bond or a divalent linking group. The divalent linking group is preferably selected from the group consisting of —O—, —S—, —CO—, —NR—, —SO—, —$SO_2$—, a divalent chain group, a divalent cyclic group, and combinations thereof. R is hydrogen or an alkyl group having 1 to 7 carbon atoms, preferably hydrogen or an alkyl group having 1 to 4 carbon atoms, more preferably hydrogen, methyl or ethyl, and most preferably hydrogen. The divalent chain group has the same as the group represented by $Ch_1$, $Ch_2$, $Ch_3$ and $Ch_4$ (described below). The divalent cyclic group has the same as the group represented by $Cy_1$, $Cy_2$, $Cy_3$ and $Cy_4$ (described below).

Each of $L_{21}$, $L_{22}$, $L_{23}$ and $L_{24}$ is preferably a single bond, *—O—CO—, *—CO—O—, *—$CH_2$—$CH_2$—, *—O—$CH_2$—, *—$CH_2$—O—, *—O—$SO_2$—, or *—CO—$CH_2$—$CH_2$—, and more preferably a single bond, *—O—CO— or *—CO—O—. The mark of * indicates the side attached to the ring in the formula (III).

In the formula (III), each of $Cy_1$, $Cy_2$, $Cy_3$ and $Cy_4$ is independently a divalent cyclic group having at least one aromatic, aliphatic or heterocyclic ring.

The divalent cyclic group preferably has a five-membered, six-membered or seven-membered ring, more preferably has a five-membered or six-membered ring, and most preferably has a six-membered ring. The ring contained in the cyclic group may have a condensed ring. However, a monocyclic ring is preferred to a condensed ring.

Examples of the aromatic rings contained in the divalent cyclic group include benzene ring and naphthalene ring. Examples of the aliphatic rings include cyclohexane ring. Examples of the heterocyclic rings include pyridine ring, pyrimidine ring, thiophene ring, 1,3-dioxane ring and 1,3-dithian ring.

The divalent cyclic group containing benzene ring is preferably 1,4-phenylene. The cyclic group containing naphthalene ring is preferably naphthalene-1,5-diyl or naphthalene-2,6-diyl. The cyclic group containing cyclohexane ring is preferably 1,4-cyclohexylene. The cyclic group containing pyridine ring is preferably pyridine-2,5-diyl. The cyclic group containing pyrimidine ring is preferably pyrimidine-2,5-diyl. The cyclic group containing thiophene ring is preferably thiophene-2,5-diyl. The cyclic group containing 1,3-dioxane ring is preferably 1,3-dioxylene-2,5-diyl. The cyclic group containing 1,3-dithian ring is preferably 1,3-dithianylene 2,5-diyl and $Cy_4$ is preferably 1,4-phenylene, 1,4-cyclohexylene, pyridine-2,5-diyl, pyrimidine-2,5-diyl or 1,3-dioxylene-2,5-diyl, and more preferably 1,4-phenylene, 1,4-cyclohexylene or 1,3-dioxylene-2,5-diyl.

The divalent cyclic can have substituent groups. Examples of the substituent groups include a halogen atom (fluorine, chlorine, bromine, iodine), cyano, nitro, an alkyl group having 1 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, carbamoyl, an alkyl carbamoyl group having 2 to 16 carbon atoms, and an acylamino (amido) group having 2 to 16 carbon atoms. The substituent group is preferably a halogen atom, cyano, nitro, an alkyl group having 1 to 8 carbon atoms, an alkoxy group having 1 to 8 carbon atoms, an acyl group having 2 to 8 carbon atoms, an acyloxy group having 2 to 8 carbon atoms or an alkoxycarbonyl group having 2 to 8 carbon atoms, more preferably a halogen atom, cyano, an alkyl group having 1 to 3 carbon atoms, an alkoxy group having 1 to 3 carbon atoms, an acyl group having 2 to 4 carbon atoms, an acyloxy group having 2 to 4 carbon atoms or an alkoxycarbonyl group having 2 to 4 carbon atoms.

In the formula (III), each of $L_{31}$, $L_{32}$, $L_{33}$ and $L_{34}$ is independently a single bond or a divalent linking group. The divalent linking group is preferably selected from the group consisting of —O—, —S—, —CO—, —NR—, —SO—, —$SO_2$— and combinations thereof. R is hydrogen or an alkyl group having 1 to 7 carbon atoms, preferably hydrogen or an alkyl group having 1 to 4 carbon atoms, more preferably hydrogen, methyl or ethyl, and most preferably hydrogen.

Each of $L_{31}$, $L_{32}$, $L_{33}$ and $L_{34}$ is preferably a single bond, *—O—, *—O—CO—, *—CO—O—, *—O—CO—O—, *—CO—, *—S—, *—O—$SO_2$—, or *—NR—, more preferably a single bond, *—O—, *—O—CO—, *—CO—O— or *—O—CO—O—. The mark of * indicates the position where the divalent cyclic group of $Cy_1$, $Cy_2$, $Cy_3$ or $Cy_4$ is connected.

In the formula (III), each of $Ch_1$, $Ch_2$, $Ch_3$ and $Ch_4$ is independently a divalent chain group selected from the group consisting of an alkylene group, a substituted alkylene group, an alkenylene group, a substituted alkenylene group, an alkynylene group and a substituted alkynylene group. An alkylene group, a substituted alkylene group, an alkenylene group and a substituted alkenylene group are preferred, and an alkylene group and an alkenylene group are more preferred.

The alkylene group can have a branched structure. The alkylene group has preferably 1 to 16, more preferably 2 to 14, and most preferably 2 to 12 carbon atoms.

The alkylene moiety in the substituted alkylene group is the same as the above alkylene group. Examples of the substituent group include a halogen atom.

The alkenylene group can have a branched structure. The alkenylene group has preferably 2 to 16, more preferably 2 to 14, and most preferably 2 to 12 carbon atoms.

The alkenylene moiety in the substituted alkenylene group is the same as the above alkenylene group. Examples of the substituent group include a halogen atom.

The alkynylene group can have a branched structure. The alkynylene group has preferably 2 to 16, more preferably 2 to 14, and most preferably 2 to 12 carbon atoms.

The alkynylene moiety in the substituted alkynylene group is the same as the above alkynylene group. Examples of the substituent group include a halogen atom.

Examples of the divalent chain groups include ethylene, trimethylene, tetramethylene, 1-methyltetramethylene, pentamethylene, hexamethylene, octamethylene, nonamethylene, decamethylene, undecamethylene, dodecamethylene, 2-butenylene and 2-butynylene.

In the formula (III), each of $Q_{21}$, $Q_{22}$, $Q_{23}$ and $Q_{24}$ is independently hydrogen or a polymerizable group.

In the case where the compound of the formula (III) is used in an optical compensatory film such as the phase retarder (in which the phase difference preferably does not change thermally), each of $Q_{21}$, $Q_{22}$, $Q_{23}$ and $Q_{24}$ is preferably a polymerizable group.

The polymerization caused by each of $Q_{21}$, $Q_{22}$, $Q_{23}$ and $Q_{24}$ is preferably addition polymerization (including ring-opening polymerization) or condensation polymerization. In other words, the polymerizable group is preferably a functional group capable of addition or condensation polymerization. Examples of the polymerizable group are shown below.

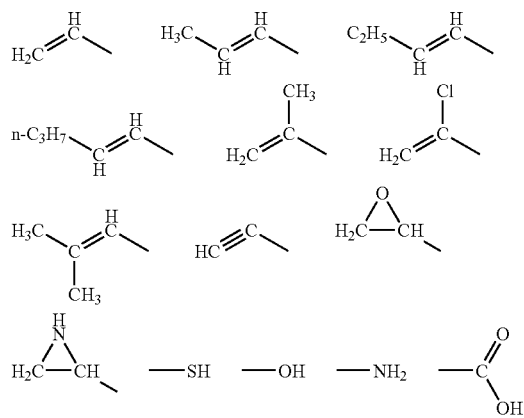

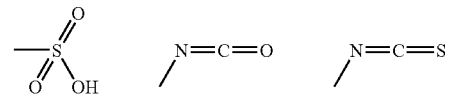

The polymerizable group is more preferably a functional group capable of addition polymerization. Polymerizable ethylenically unsaturated groups and ring-opening polymerizable groups are preferred. Examples of the polymerizable ethylenically unsaturated groups include the following (M-1) to (M-6).

In the formulas (M-3) and (M-4), R is hydrogen or an alkyl group, and preferably is hydrogen or methyl.

(M-1) and (M-2) are preferred and (M-1) is further preferred.

Cyclic ether groups are preferred ring-opening polymerizable groups. Epoxy and oxetanyl are more preferred, and epoxy is most preferred.

Each of $Q_{21}$, $Q_{22}$, $Q_{23}$ and $Q_{24}$ is most preferably —O—CO—CR=$CH_2$, in which R is hydrogen or methyl (preferably hydrogen).

Examples of *-$L_{21}$-$Cy_1$-$L_{31}$-$Ch_1$-$Q_{21}$, *-$L_{22}$-$Cy_2$-$L_{32}$-$Ch_2$-$Q_{22}$, *-$L_{23}$-$Cy_3$-$L_{33}$-$Ch_3$-$Q_{23}$ and *-$L_{24}$-$Cy_4$-$L_{34}$-$Ch_4$-$Q_{24}$ are shown below. The mark of * indicates the side attached to the ring in the formula (III). Cy means the divalent cyclic group, Ch means the divalent chain group, R means a hydrogen or an alkyl group having 1 to 7 carbon atoms, and Q means hydrogen or a polymerizable group.

L-1: *-Cy-O-Ch-Q
L-2: *—O—CO-Cy-O-Ch-Q
L-3: *—CO—O-Cy-O-Ch-Q
L-4: *—NR—CO-Cy-O-Ch-Q
L-5: *-Ch-Cy-O-Ch-Q
L-6: *—O—CO-Ch-Cy-O-Ch-Q
L-7: *—CO—O-Ch-Cy-O-Ch-Q
L-8: *-Cy-CO-O-Ch-Q
L-9: *—O—CO-Cy-CO—O-Ch-Q
L-10: *—CO—O-Cy-CO—O-Ch-Q
L-11: *—NR—CO-Cy-CO—O-Ch-Q
L-12: *-Ch-Cy-CO—O-Ch-Q
L-13: *—O—CO-Ch-Cy-CO—O-Ch-Q
L-14: *—CO—O-Ch-Cy-CO—O-Ch-Q
L-15: *-Cy-O—CO-Ch-Q
L-16: *—O—CO-Cy-O—CO-Ch-Q
L-17: *—CO—O-Cy-O—CO-Ch-Q
L-18: *—NR—CO-Cy-O—CO-Ch-Q
L-19: *-Ch-Cy-O—CO-Ch-Q
L-20: *—O—CO-Ch-Cy-O—CO-Ch-Q
L-21: *—CO—O-Ch-Cy-O—CO-Ch-Q
L-22: *-Cy-O—CO—O-Ch-Q
L-23: *—O—CO-Cy-O—CO—O-Ch-Q
L-24: *—CO—O-Cy-O—CO—O-Ch-Q
L-25: *—NR—CO-Cy-O—CO—O-Ch-Q
L-26: *-Ch-Cy-O—CO—O-Ch-Q
L-27: *—O—CO-Ch-Cy-O—CO—O-Ch-Q
L-28: *—CO—-Ch-Cy-O—CO—O-Ch-Q

Examples of the compound represented by the formula (I) or (III) are shown below.

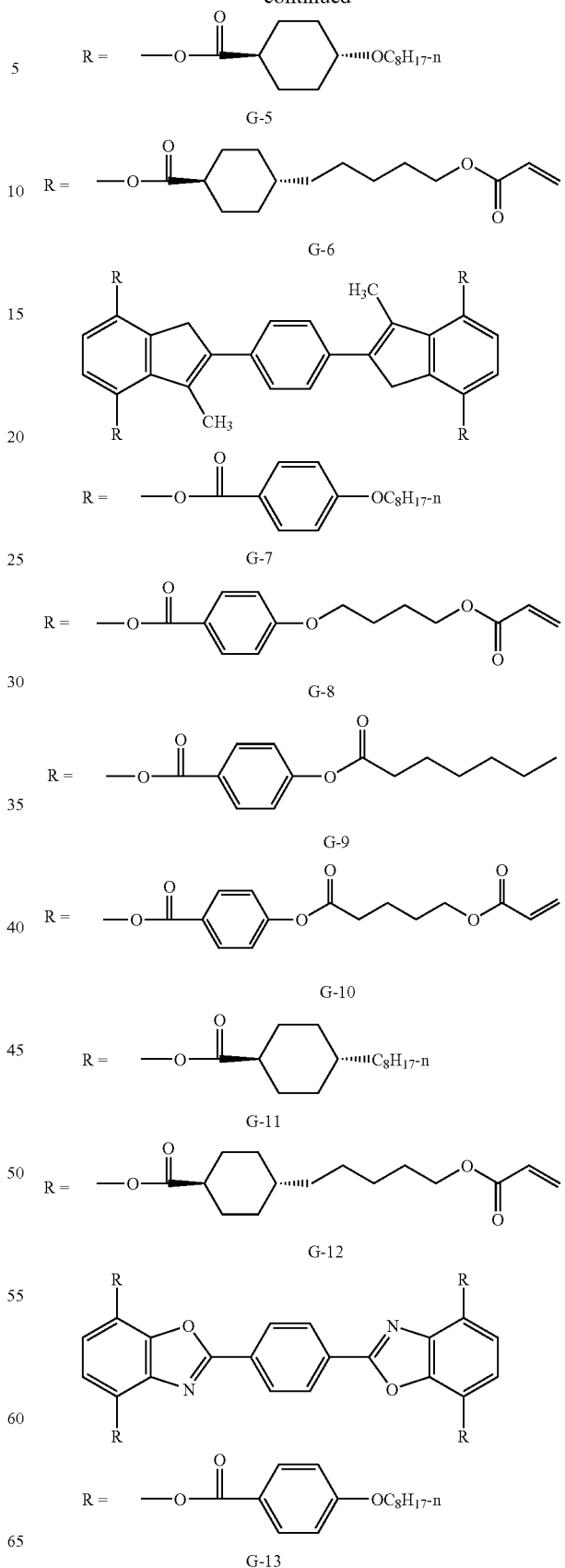

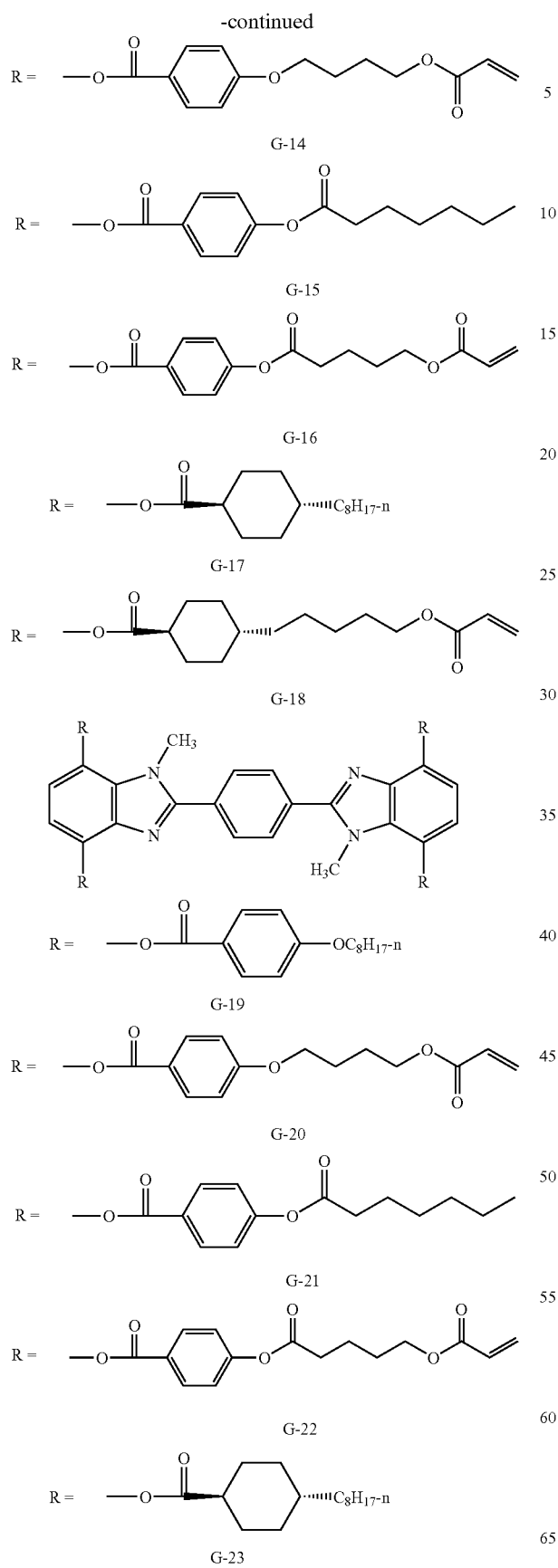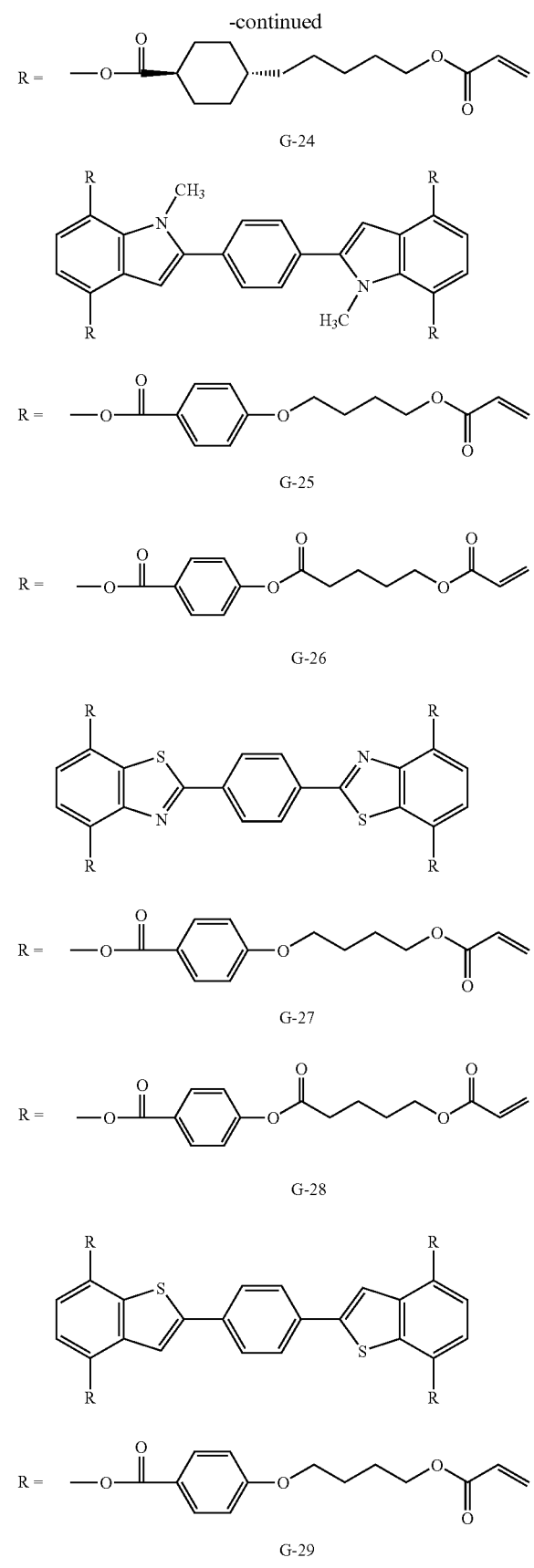

-continued
R = 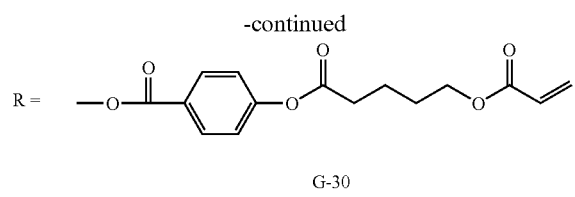
G-30
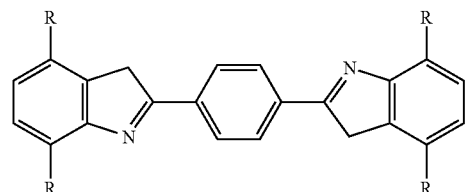
R = 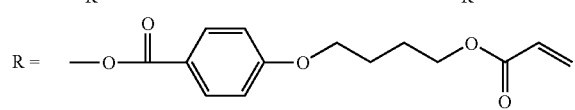
G-31
R = 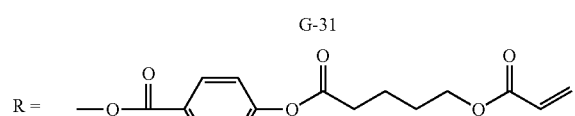
G-32
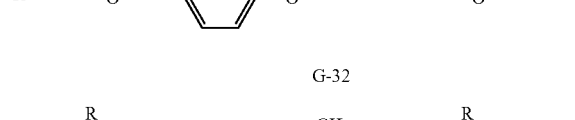
R = 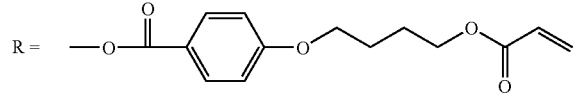
G-33
R = 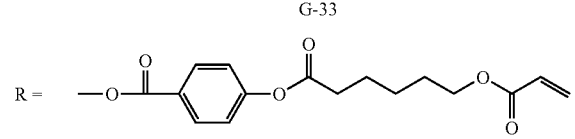
G-34
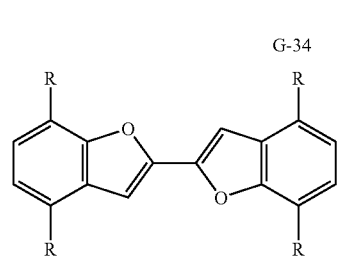
R = 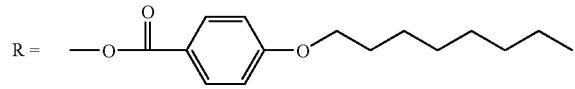
G-35
R = 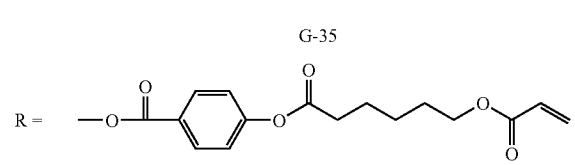
G-36
-continued
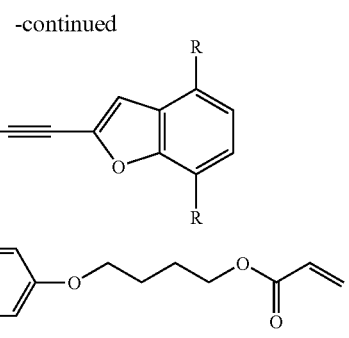
R = 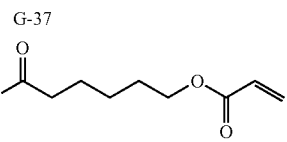
G-37
R = (similar ester acrylate group)
G-38
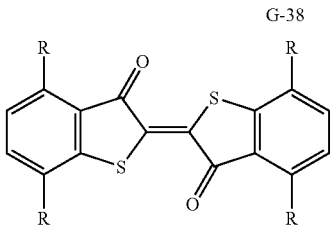
R = 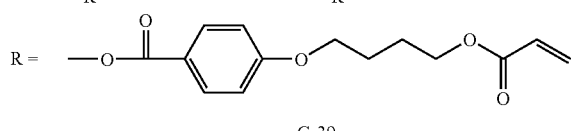
G-39
R = 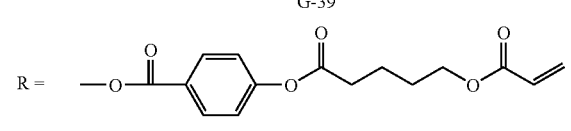
G-40
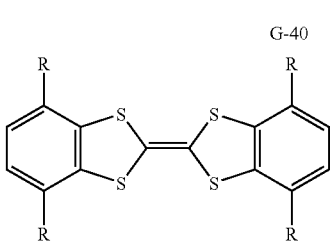
R = 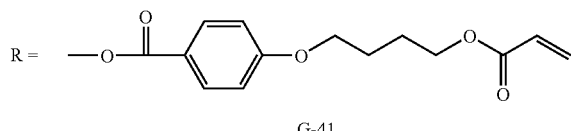
G-41
R = 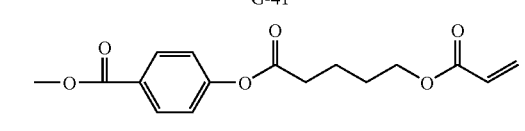
G-42
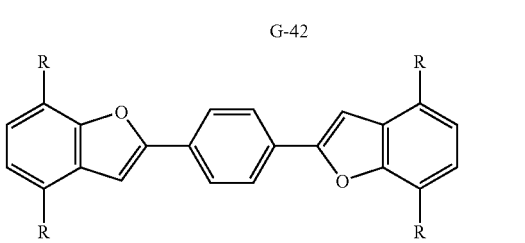

-continued

G-43, G-44, G-45, G-46, G-47, G-48, G-49, G-50, G-51, G-52, G-53, G-54, G-55

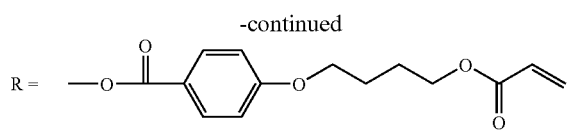
G-56
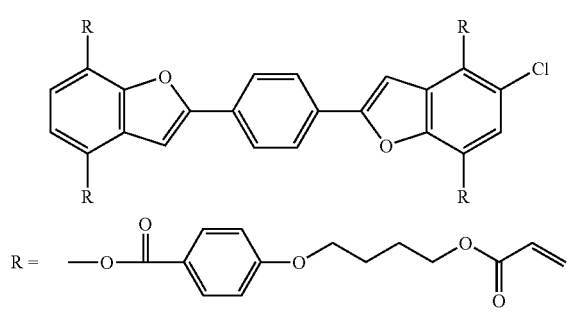
G-57
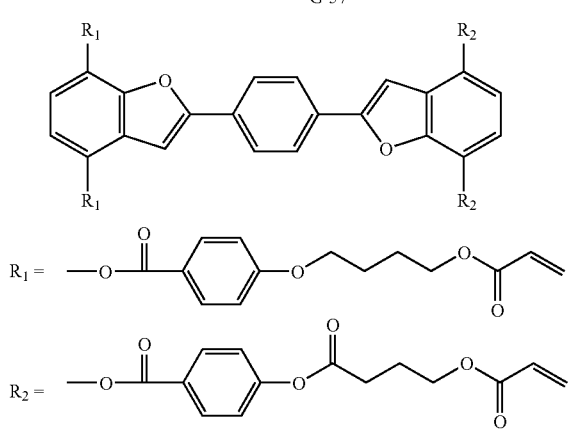
G-58
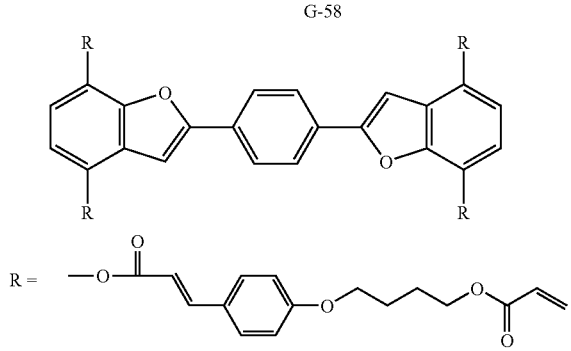
G-59
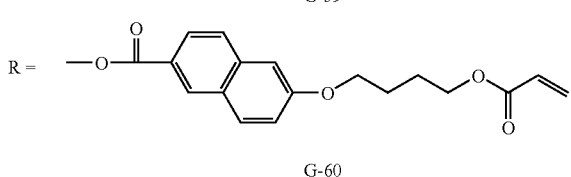
G-60
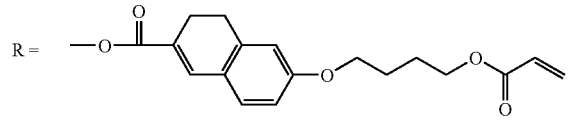
G-61
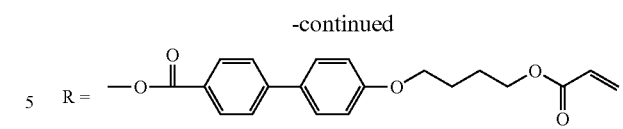
G-62
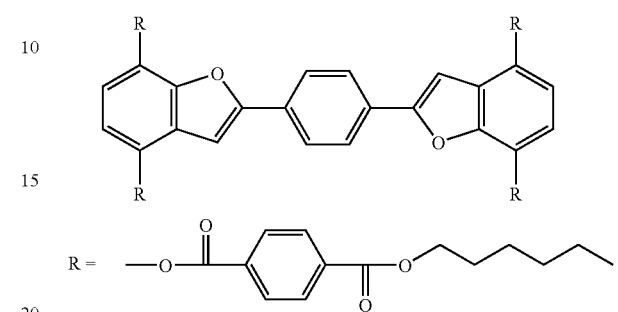
G-63
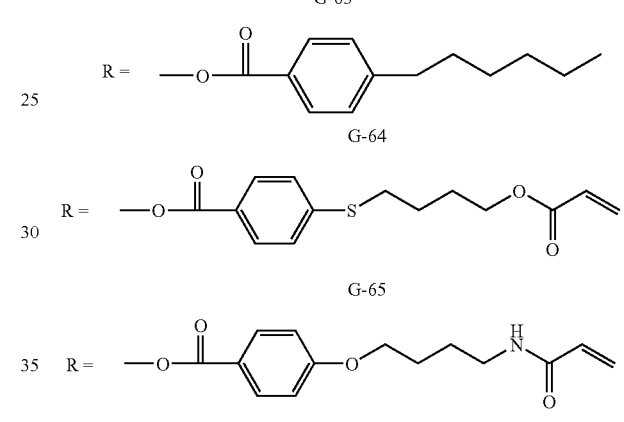
G-64
G-65
G-66
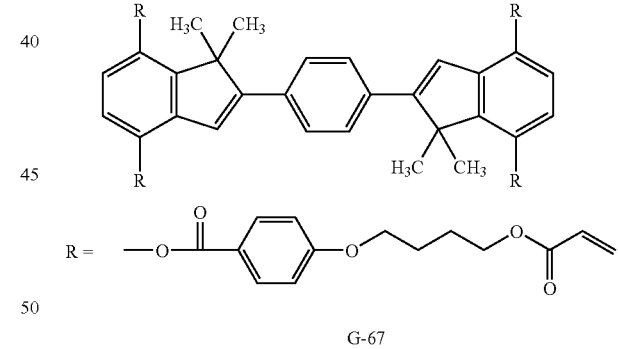
G-67
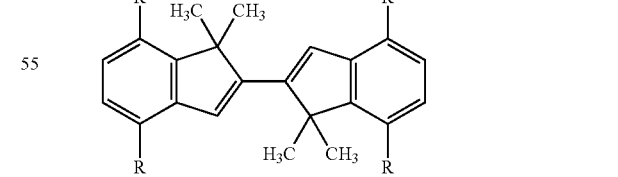
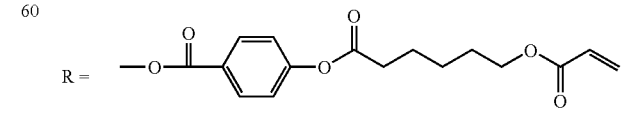
G-68

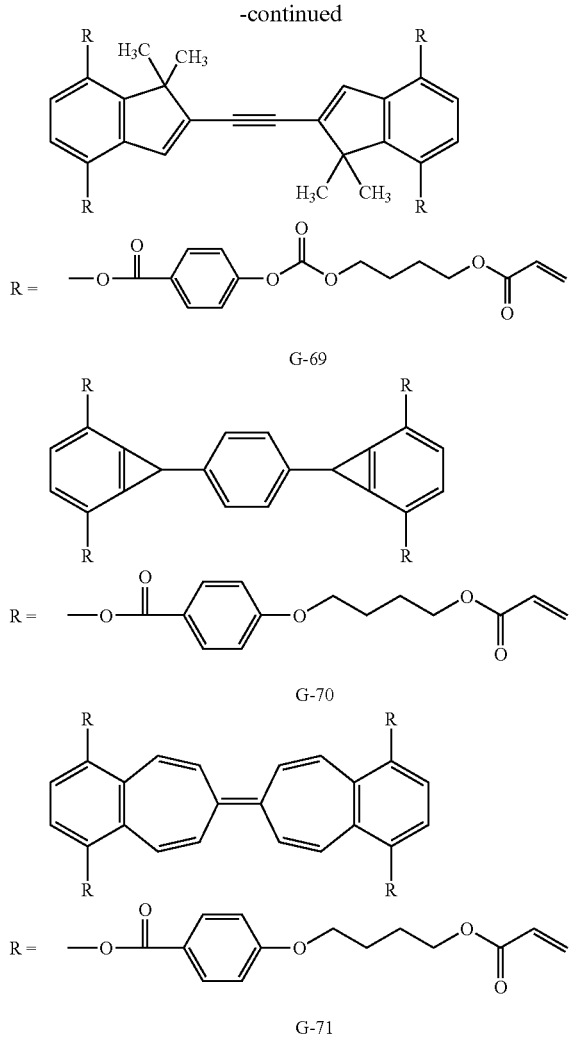

The liquid crystal compound of the invention preferably has a specific birefringent index Δn showing inverse wavelength distribution, which means Δn satisfies the following formula (II). The compound of the invention gives the wavelength distribution almost independently from the temperature, but for characterizing the present invention more specifically the formula (II) is defined as a condition measured at the temperature 20° C. lower than the upper limit beyond which the phase changes. If the temperature range in which the liquid crystal phase is kept is narrower than 20° C., the measuring temperature is 10° C. lower than the upper limit of the liquid crystal phase. If the temperature range of the liquid crystal phase is narrower than 10° C., the measuring temperature is 5° C. lower than the upper limit. If the temperature range is narrower than 5° C., the measuring temperature is 2° C. lower than the upper limit.

$$\Delta n(450\ nm)/\Delta n(550\ nm)<1.0 \qquad \text{Formula (II):}$$

What wavelength distribution the Δn preferably has depends on the usage of the liquid crystal compound, and hence it cannot be determined uniformly. The Δn, however, preferably satisfies the conditions represented by the following formulas (II)-1 and (II)-2.

$$0.60<\Delta n(450\ nm)/\Delta n(550\ nm)<0.99 \qquad \text{Formula (II)-1:}$$

$$1.01<\Delta n(650\ nm)/\Delta n(550\ nm)<1.35. \qquad \text{Formula (II)-2:}$$

Further, in the case where the liquid crystal compound of the invention is used in a λ/4 plate, the Δn preferably satisfies the conditions represented by the following formulas (II)-3 and (II)-4.

$$0.60<\Delta n(450\ nm)/\Delta n(550\ nm)<0.95 \qquad \text{Formula (II)-3:}$$

$$1.04<\Delta n(650\ nm)/\Delta n(550\ nm)<1.35 \qquad \text{Formula (II)-4:}$$

In the formulas, Δn(450 nm), Δn(550 nm) and Δn(650 nm) are the values of Δn measured at 450 nm, 550 nm and 650 nm, respectively. Each wavelength includes an error of ±10 nm.

The liquid crystal compound of the invention may have either positive or negative birefringence, but preferably has positive birefringence.

Liquid crystal phases having positive birefringence are described in detail in, for example, "Liquid Crystal Handbook (written in Japanese)", published by Maruzen (2000). Examples of them include nematic phase, cholesteric phase and smectic phase (e.g., smectic A phase, smectic C phase).

When used for an optically anisotropic layer, the compound of the invention preferably forms such a mono-domain phase that the molecules of the compound can be oriented in even alignment without any defect. If not, a poly-domain structure having plural domains is formed and hence defects, which scatter light, are formed on the borders among the domains, and consequently the obtained anisotropic layer has poor transparence. The liquid crystal compound of the invention, therefore, preferably forms nematic phase (N phase) or smectic A phase ($S_A$ phase) for ensuring the mono-domain structure. It is particularly preferred to form nematic phase.

The liquid crystal compound may be either a compound of low molecular weight or a polymer, but preferably a compound of low molecular weight because low molecular weight-molecules are easily aligned.

The liquid crystal compound preferably has a polymerizable group, which is more preferably positioned at the terminal of the molecule. In fact, a phase retarder prepared from the compound having a polymerizable group hardly changes the phase retardation thermally.

The Δn of liquid crystal can be measured in a wedged liquid crystal cell described in, for example, "Liquid Crystal Handbook (written in Japanese)", 2.4.13, published by Maruzen (2000). In the manner described in the publication, the Δn at each wavelength of 450 nm, 550 nm and 650 nm is determined through each band-filter. If having a polymerizable group, the liquid crystal compound sometimes polymerizes in the wedged liquid crystal cell to disturb the measurement. In that case, it is preferred to incorporate a polymerization inhibiter. The Δn can be also determined in another manner. First, the molecules of the liquid crystal compound are evenly aligned, and then the phase retardation is measured by means of, for example, KOBRA21ADH (OJI SCIENTIFIC INSTRUMENTS CO., LTD.) to obtain Re at each wavelength. Independently, the thickness of the layer of the aligned molecules is measured, and then the Δn is calculated according to the formula: Δn=Re/d (d: thickness).

[Liquid Crystal Composition]

The liquid crystal composition of the invention may contain various additives as well as the liquid crystal compound of the invention. Examples of the additives include liquid crystal compounds other than the compound of the invention, an agent for controlling alignment of molecules on the interface between the layer and air (alignment controller for air interface), an anti-repelling agent, a polymerization initiator and a polymerizable monomer.

The liquid crystal composition of the invention contains the compound represented by the formula (I). When used for a phase retarder, the composition of the invention preferably forms such a mono-domain phase that even alignment without any defect can be obtained. If not, a poly-domain structure having plural domains is formed and hence defects, which scatter light, are formed on the borders among the domains, and consequently the obtained retarder has poor transparence. The composition of the invention, therefore, preferably forms nematic phase (N phase) for ensuring the mono-domain structure.

Also when used for a phase retarder, the composition of the invention forms a liquid crystal phase preferably in the temperature range of 10 to 250° C., more preferably in the temperature range of 10 to 150° C., in consideration of the production process of phase retarder. If the temperature range is below 10° C., a cooling procedure may be required. If the temperature range is above 200° C., the composition must be heated beyond the temperature giving a liquid crystal phase so that the composition may be once in isotropic liquid state. Accordingly, thermal energy is wasted and the substrate may deform or deteriorate thermally.

The liquid crystal compound of the invention may be used singly or in combination. For example, a polymerizable compound and a non-polymerizable one can be used in combination. It is also possible to use a liquid crystal compound of low molecular weight and one of high molecular weight in combination. Further, two liquid crystal compounds satisfying the formula (II) may be used in combination.

It is not necessary for the compound of the invention represented by the formula (III) to behave as liquid crystal. In that case, the compound may be mixed with another compound of the invention behaving as liquid crystal to prepare a liquid crystal composition. Otherwise, the compound may be mixed with a liquid crystal compound not included in the invention to prepare a liquid crystal composition.

The liquid crystal compound of the invention satisfying the formula (II) may be mixed with a liquid crystal compound giving normal wavelength distribution of $\Delta n$. Here, "normal wavelength distribution" means that the $\Delta n$ satisfies the condition represented by the following formula (II-a).

$\Delta n(450 \text{ nm})/\Delta n(550 \text{ nm}) \geq 1.0$     Formula (II-a):

If the compound satisfying the formula (II) is mixed with a liquid crystal compound giving normal wavelength distribution of $\Delta n$, the obtained liquid crystal composition gives intermediate wavelength distribution, which means the $\Delta n$ satisfies the condition represented by the following formula (II-b). In this way, according to the invention, the composition satisfying the formula (II-b) can be easily prepared although it has been very difficult to prepare that composition from conventional liquid crystal compounds.

$1.0 \leq \Delta n(450 \text{ nm})/\Delta n(550 \text{ nm}) < 1.1$     Formula (II-b):

Since behaving as liquid crystal, the compound satisfying the formula (II) is usually mixable in any ratio with a liquid crystal compound giving normal wavelength distribution of $\Delta n$. Accordingly, it is possible to adjust the mixing ratio so that the aimed wavelength distribution can be obtained.

[Alignment Controller for Air Interface]

Liquid crystal molecules on the interface between the layer and air are oriented with a specific tilt angel (inclined angle) of the interface. The tilt angel is known to depend upon the liquid crystal compound, and hence it is necessary to control the tilt angel according the aimed optical characters of phase retarder. The tilt angel is preferably controlled with additives though it can be controlled by applying external field such as electric field or magnetic field. A preferred example of the additives is a compound having a substituted or non-substituted aliphatic group having 6 to 40 carbon atoms or having an oligosiloxanoxy group substituted with a substituted or non-substituted aliphatic group having 6 to 40 carbon atoms. The number of the aliphatic group or the oligosiloxanoxy group is preferably two or more.

The alignment controller is added in an amount of preferably 0.001 to 20 wt. %, more preferably 0.01 to 10 wt. %, and most preferably 0.1 to 5 wt. %, based on the amount of the liquid crystal composition.

[Anti-Repelling Agent]

In order to prevent repelling of the liquid crystal composition in coating, a polymer material is preferably added to the composition. There is no particular restriction on the polymer material as long as it does not give unfavorable effects to the orientation or the inclined angle of the liquid crystal compound. Japanese Patent Provisional Publication No. 8(1996)-95030 describes examples of the polymer material. Among them, cellulose esters are particularly preferred. Examples of the cellulose esters include cellulose acetate, cellulose acetate propionate, hydroxypropyl cellulose and cellulose acetate butyrate. The polymer material of anti-repelling agent is added in an amount of preferably 0.1 to 10 wt. %, more preferably 0.1 to 8 wt. %, and most preferably 0.1 to 5 wt. %, based on the amount of the liquid crystal compound.

[Polymerization Initiator]

In the present invention, molecules of the liquid crystal compound are preferably oriented and fixed essentially in mono-domain alignment. Namely, the molecules are preferably aligned evenly and fixed with the even alignment kept. Accordingly, if the compound of the formula (III) has a polymerizable group Q, the molecules thereof are fixed preferably by a polymerization reaction.

The polymerization reaction may be a thermal polymerization reaction caused by a thermal polymerization initiator, a photo-polymerization reaction caused by a photo polymerization initiator or a polymerization reaction caused by electron beams. The photo-polymerization reaction or electron beam-polymerization reaction is preferred for fear that the support or other parts may thermally deform or deteriorate during the thermal polymerization reaction. Examples of the photo-polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970). The amount of the photo polymerization initiator is preferably in the range of 0.01 to 20 wt. %, and more preferably in the range of 0.5 to 5 wt. % based on the solid content of the coating solution. The light irradiation for the photo polymerization is preferably conducted with ultraviolet rays. The exposure energy is preferably in the range of 10 to 50,000 mJ/cm$^2$, and more preferably in the range of 50 to 800 mJ/cm$^2$. The light irradiation can be conducted while the layer is heated to accelerate the photo-polymerization reaction. If the aimed polymerization degree is not obtained in air, oxygen gas in the atmosphere may be purged by, for example, introducing nitrogen gas. This is because the oxygen gas often lowers the polymerization degree. The oxygen gas content is preferably 10% or less, more preferably 7% or less, most preferably 3% or less.

[Polymerizable Monomer]

To the liquid crystal composition, a polymerizable monomer may be added. There is no particular restriction on the polymerizable monomer usable with the liquid crystal compound, as long as it is compatible with the liquid crystal compound and it neither changes the inclined angle nor disturbs the alignment of the liquid crystal molecules. Preferred are compounds having polymerizable ethylenically unsaturated groups such as vinyl, vinyloxy, acryloyl and methacryloyl. The amount of the polymerizable monomer is generally in the range of 0.5 to 50 wt. %, preferably in the range of 1 to 30 wt. %. Particularly preferred is a monomer having two or more reactive functional groups because adhesion between the alignment layer and the optically anisotropic layer can be improved.

[Solvent]

As a solvent for preparing the liquid crystal composition, an organic solvent is preferably used. Examples of the organic solvent include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone, methyl isobutyl ketone, cyclohexanone) and ethers (e.g., tetrahydrofuran, 1,2-dimethoxyethane). Alkyl halides, esters and ketones are preferred. Two or more organic solvents can be used in combination.

[Coating Method]

The optically anisotropic layer is formed by the steps of: dissolving or dispersing the liquid crystal composition in the above solvent to prepare a coating solution, spreading the coating solution to coat the alignment layer, and aligning molecules of the compound. The coating solution can be spread according to a conventional coating method (such as a wire-bar coating method, an extrusion coating method, a direct gravure coating method, a reverse gravure coating method or a die coating method).

[Alignment Layer]

The alignment layer can be formed by rubbing treatment of an organic compound (preferably a polymer), by oblique evaporation of an inorganic compound, by formation of a micro groove layer, or by stimulation of an organic compound (e.g., ω-tricosanoic acid, dioctadecylmethylammonium chloride, methyl stearate) according to a Langmuir-Blodgett (LB) method. Further; the aligning function of the alignment layer can be activated by applying an electric or magnetic field to the layer or by irradiating the layer with light. Any method can be used to form the alignment layer as long as molecules of the liquid crystal compound can be oriented in a desired alignment. However, in the invention, the orientation layer is preferably formed by rubbing a polymer layer or by irradiating a polymer layer with light. An alignment layer formed by rubbing a polymer layer is particularly preferred. The rubbing treatment can be conducted by rubbing a polymer layer with paper or cloth several times in a certain direction, and is preferably conducted in the manner described in "Liquid Crystal Handbook (written in Japanese)", published by Maruzen. The alignment layer preferably has a thickness of 0.01 to 10 µm, more preferably 0.05 to 3 µm.

Polymer materials usable for the alignment layer are described in many publications, and many of them can be commercially available. The alignment layer preferably used in the invention is made of polyvinyl alcohol or derivatives thereof. Particularly preferred is a modified polyvinyl alcohol having hydrophobic groups. Orientation layers for discotic liquid crystal compounds are preferably used, and are described in PCT Publication WO01/88574A1, pp. 43, line 24 to pp. 49, line 8.

[Rubbing Density of Alignment Layer]

The tilt angel of liquid crystal molecules on the interface between the alignment layer and the liquid crystal layer has a relation to rubbing density of the alignment layer. In fact, the higher the rubbing density is, the smaller the tilt angel is. The lower the rubbing density is, the larger the tilt angel is. Accordingly, the tilt angel can be controlled by controlling the rubbing density. The rubbing density can be controlled in the manner described in "Liquid Crystal Handbook (written in Japanese)", published by Maruzen (2000). The rubbing density (L) is defined by the formula (A):

$$L=Nl\{l+(2\pi rn/60v)\}$$

in which N stands for how many times the layer is rubbed, l stands for the contact length between the layer and the rubbing roller, r stands for a radius of the rubbing roller, n stand for revolutions of the roller (rpm), and v stands for velocity of the moving stage (per second).

According to the formula (A), the rubbing density can be increased by repeating the rubbing treatment, by increasing the contact length, by enlarging the radius of roller, by revving up the roller, or by moving the stage more slowly. Naturally, in the case where the rubbing density is wanted to decrease, these may be inversely operated.

[Transparent Support]

The phase retarder of the invention comprises a transparent support. There is no particular restriction on the material of the support as long as it is optically isotropic and has a transmittance of 80% or more, but a polymer film is preferably used. Examples of the polymer include cellulose esters (e.g., cellulose diacetate, cellulose triacetate), norbornene-based polymers and poly(meth)acrylic esters. Many commercially available polymers can be used. In consideration of optical characters, cellulose esters are preferred, and cellulose esters of lower fatty acids are more preferred. The term "lower fatty acids" means fatty acids having 6 or less carbon atoms. The number of carbon atoms is preferably 2 (cellulose acetate), 3 (cellulose propionate) or 4 (cellulose butyrate). Cellulose triacetate is particularly preferred. Cellulose esters of mixed fatty acids such as cellulose acetate propionate and cellulose acetate butyrate are also usable. In addition, polymers that originally show birefringence (e.g., polycarbonate, polysulfone) can be also used if modified in the manner described in PCT Publication No. 00/26705 to reduce the birefringence.

Cellulose esters preferably used for the transparent support are described below in detail. As the cellulose ester, cellulose acetate having an acetic acid content of 55.0 to 62.5% is preferably used. The acetic acid content is more preferably in the range of 57.0 to 62.0%.

The term "acetic acid content" means the amount of combined acetic acid per one unit weight of cellulose. The acetic acid content is determined according to ASTM: D-817-91 (tests of cellulose acetate). The cellulose ester has a viscosity average polymerization degree (DP) of preferably 250 or more, more preferably 290 or more. Further, it is also preferred for the cellulose ester to have a narrow molecular weight distribution of Mw/Mn (Mw and Mn are weight and number average molecular weights, respectively) determined by gel permeation chromatography. The value of Mw/Mn is preferably in the range of 1.0 to 4.0, more preferably in the range of 1.3 to 3.5, most preferably in the range of 1.4 to 3.0.

In cellulose triacetate, hydroxyl groups at 2-, 3- and 6-position of cellulose are not equally substituted (namely, the substitution degree at each position is not equal to one third of the total substitution degree), and the substitution degree at 6-position is apt to be relatively small. In the cellulose triacetate used in the invention, however, the substitution degree at 6-position is preferably larger than those at 2- and 3-positions. The substitution degree at 6-position is preferably 30% to 40%, more preferably 31% to 40%, most preferably 32% to 40%, based on the total substitution degree. Further, the substitution degree at 6-position is preferably 0.88 or more. The hydroxyl at 6-position may be replaced with an acyl group having 3 or more carbon atoms other than acetyl group (e.g., propionyl, butylyl, valeronyl, benzoyl, acryloyl). The substitution degree at each position can be measured by means of NMR. A cellulose ester having a high substitution degree at 6-position can be prepared according to the methods described in Japanese Patent Provisional Publication No. 11(1999)-5851.

The polymer film, particularly, the cellulose acetate film of the transparent support may contain a retardation-increasing agent, to have a proper retardation. The retardation-increasing agent is preferably an aromatic compound having at least two aromatic rings. The retardation-increasing agent is incorporated in an amount of preferably 0.01 to 20 weight parts, more preferably 0.05 to 15 weight parts, most preferably 0.1 to 10 weight parts, based on 100 weight parts of the cellulose acetate. Two or more aromatic compounds may be used in combination. The aromatic ring in the aromatic compound may be an aromatic hydrocarbon ring or an aromatic heterocyclic ring.

As the aromatic hydrocarbon ring, a six-membered ring (namely, a benzene ring) is particularly preferred. The aromatic heterocyclic ring is generally unsaturated. The aromatic heterocyclic ring is preferably a five-, six- or seven-membered ring, and more preferably a five- or six-membered ring. The aromatic heterocyclic ring generally has double bonds as many as possible. The hetero-atom in the ring preferably is nitrogen atom, sulfur atom or oxygen atom, and more preferably is nitrogen atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring. Preferred aromatic rings are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring. Benzene ring and 1,3,5-triazine ring are more preferred. The aromatic compound preferably contains at least one 1,3,5-triazine ring. The number of aromatic rings in the aromatic compound is preferably in the range of 2 to 20, more preferably in the range of 2 to 12, further preferably in the range of 2 to 8, and most preferably in the range of 2 to 6.

The relation of the two or more aromatic rings is categorized into three cases, namely (a) the case in which the aromatic rings form a condensed ring, (b) the case in which the aromatic rings are connected through a single bond, and (c) the case in which the aromatic rings are connected through a linking group. [In this case, a spiro-bonding is not formed because the rings are aromatic.] The relation of the aromatic rings may be any of the cases (a) to (c). PCT Publication Nos. 01/88574A1 and 00/2619A1, Japanese Patent Provisional Publication Nos. 2000-111914, 2000-275434 and Japanese Patent Application No. 2002-70009 describe the retardation-increasing agent.

The transparent support of cellulose acetate may be a single film or may consist of two or more layers. For example, a single film of cellulose triacetate can be prepared by the drum-casting method disclosed in, for example, Japanese Patent Publication No. 7(1995)-11055 or by the band-casting method. A cellulose triacetate support consisting of two or more layers can be prepared by the cooperative casting method described in, for example, Japanese Patent Publication No. 62(1987)-43846 and Japanese Patent Provisional Publication No. 61(1986)-94725. In that method, first, flakes of the materials are dissolved in a solvent such a halogenated hydrocarbon (e.g., dichloro-methane), an alcohol (e.g., methanol, ethanol, butanol), an ester (methyl formate, methyl acetate) or an ether (dioxane, dioxolane, diethyl ether). To the solution, various additives such as plasticizer, ultraviolet absorber, deterioration inhibitors, slipping agent and releasing aid are added, if desired. The thus-prepared solution (referred to as "dope") is then cast onto a support (a horizontal endless metal band or a rotating drum) from a dope-supplying machine (referred to as "die"). If a single film is to be formed, a single dope is cast. If two or more layers are to be formed, a highly concentrated cellulose ester dope and a low concentrated one are cooperatively cast so that the highly concentrated dope and the low concentrated one may be side-by-side spread. The spread dopes are dried until a rigid film is formed. The film is then peeled and transferred through a drying zone to remove the solvent.

A typical solvent for dissolving cellulose triacetate is dichloromethane, but in consideration of protecting the global environmental conditions and working conditions, the solvent preferably contains essentially no halogenated hydrocarbon such as dichloromethane. This means the content of halogenated hydrocarbon is preferably less than 5 wt. % or less (more preferably less than 2 wt. %). In order to prepare a dope of cellulose triacetate from a solvent containing essentially no halogenated hydrocarbon such as dichloromethane, a particular dissociation method described later is needed. That dissolving method is referred as "cooling dissociation method" or "heating dissociation method". The cellulose triacetate film essentially free from halogenated hydrocarbon and the preparation process thereof are described in Japan institute of invention and innovation technical report No. 2001-1745, published on Mar. 15, 2001.

Additives for improving various characters of cellulose acetate are also described in Japan institute of invention and innovation technical report No. 2001-1745, and are preferably usable in the invention.

If made of cellulose acetate, the transparent support is preferably subjected to the saponification treatment so that an adhesive layer or other functional layers may adhere well. The saponification treatment can be performed in the known manner. For example, a film of cellulose acetate is immersed in an alkaline solution. The film is then preferably washed with water well or neutralized with a diluted acid so as to remove alkali. The saponification treatment makes the surface of the film hydrophilic, and the hydrophilic surface adheres well onto a polarizing membrane mainly made of polyvinyl alcohol. In addition, dust in air seldom attaches on the hydrophilic surface, and is therefore prevented from getting between the support and the polarizing membrane. Consequently, the saponification treatment prevents the dust from causing defects.

The saponification treatment is performed so that the surface of the support may give a contact angle of preferably less than 40°, more preferably less than 30°, further preferably less than 20°, to water.

The process of the saponification treatment may be either the following (1) or (2). The process (1) is superior because the film can be treated in the same manner as a normal cellulose acetate film. However, in the process (1), the surface of optically anisotropic layer is also saponified and is often stained with remaining saponifying liquid. In that case, the process (2) is superior although it is unusual.

(1) After an optically anisotropic layer is formed on the transparent support, the laminated film is immersed in an alkali solution at least once to saponify the bottom surface.

(2) Before or after an optically anisotropic layer is formed on the transparent support, an alkali solution is spread to coat the bottom surface of the support (the surface on which the optically anisotropic layer is not provided). The coated surface was then heated, washed with water and/or neutralized, to saponify only the bottom surface.

The surface energy of the cellulose acetate film is preferably not less than 55 mN/m, more preferably in the range of 60 to 75 mN/m. The surface energy can be measured by the contact angle method, the wet heating method or the adsorption method. These methods are described in "The basic theory and application of wetting (written in Japanese)", published by Realize Co., Ltd, 1989. For measuring the cellulose acetate film in the invention, the contact angle method is preferred. In that method, two solutions having known surface energies are dropped onto the film. The contact angle of each drop is measured, and the surface energy of the film is calculated from the measured contact angles. The contact angle is, by definition, an angle (including the drop) between the film surface and the tangent of the drop surface at the crossing point.

The cellulose acetate film has a thickness normally in the range of 5 to 500 μm, preferably in the range of 20 to 250 μm, more preferably in the range of 30 to 180 μm, most preferably in the range of 30 to 110 μm.

[Phase Retarder]

The phase retarder of the invention comprises a transparent support, an alignment layer, and at least one optically anisotropic layer containing the compound represented by the formula (I). In producing the phase retarder of the invention, a liquid crystal composition containing the compound of the formula (I) is heated to a temperature in which a liquid crystal phase is formed. The composition is then cooled with the alignment in the liquid crystal phase maintained, so that molecules of the liquid crystal compound are fixed without disturbing their alignment in the liquid crystal phase. Otherwise, in producing the phase retarder, a liquid crystal composition containing a polymerization initiator and the compound having a polymerizable group is heated to a temperature for forming a liquid crystal phase, polymerized and cooled. In the present invention, the thus-fixed alignment is preferably and typically identical with the alignment in which the molecules of liquid crystal compound are oriented in the liquid crystal phase. However, they may be different from each other as long as the fixed alignment is so stably kept and not changed that the formed optically anisotropic layer is neither fluid nor deformed even if the temperature changes in the range of normally 0° C. to 50° C., severely −30° C. to 70° C. and even if external force (for example, given by external field) is applied.

In the resultant optically anisotropic layer of the phase retarder, the liquid crystal composition no longer needs to behave as liquid crystal as long as it keeps optical anisotropy. For example, in the case where the anisotropic layer is prepared from a low molecular weight-biaxial compound having a group reactive with heat or light, molecules of the compound may be thermo- or photo-chemically polymerized or crosslinked to prepare a polymer that no longer behaves as liquid crystal.

The optically anisotropic layer prepared from the liquid crystal composition has a thickness of preferably 0.1 to 20 μm, more preferably 0.2 to 15 μm, most preferably 0.3 to 10 μm.

The phase retarder of the invention preferably gives wavelength distribution satisfying the conditions represented by the following formulas (A)-1 and (A)-2.

$0.60 < R(450 \text{ nm})/R(550 \text{ nm}) < 0.99$      Formula (A)-1:

$1.01 < R(650 \text{ nm})/R(550 \text{ nm}) < 1.35$      Formula (A)-2:

In the formulas, R(450 nm), R(550 nm) and R(650 nm) are retardation values measured at 450 nm, 550 nm and 650 nm, respectively. Each wavelength includes an error of ±10 nm.

Even out of the above ranges, the phase retarder if used as a λ/4 plate may convert a linearly polarized light of 400 to 700 nm into a completely circularly polarized light at a particular wavelength. At another wavelength, however, the converted light is often far from the circularly polarized light. In consideration of this, the phase retarder more preferably gives wavelength distribution satisfying the following formulas (A)-1' and (A)-2'.

$0.60 < R(450 \text{ nm})/R(550 \text{ nm}) < 0.95$      Formula (A)-1':

$1.04 < R(650 \text{ nm})/R(550 \text{ nm}) < 1.35$      Formula (A)-2':

In the above, preferred embodiments of the invention are described from the viewpoint of retardation values in plane of the film.

With respect to the three-dimensional refractive index K (which is represented by K=[nz−(nx+ny)/2]×d), preferred embodiments of the invention are also described below. In the following description, the phase retardation values R and the K values at 450 nm, 550 nm and 650 nm are represented by R(450 nm), R(550 nm), R(650 nm), K(450 nm), K(550 nm) and K(650 nm), respectively. In the case where the K values satisfy the formula (B): K(450 nm)/K(550 nm)<1, the wavelength distribution of light not perpendicularly but obliquely coming into the film decreases like the retardation decreases according as the wavelength of the light becomes shorter. The K values satisfy preferably the following formulas (B)-1 and (B)-2, more preferably the following formulas (B)-1' and (B)-2'.

$0.60 < K(450 \text{ nm})/K(550 \text{ nm}) < 0.99$      Formula (B)-1:

$1.01 < K(650 \text{ nm})/K(550 \text{ nm}) < 1.35$      Formula (B)-2:

$0.60 < K(450 \text{ nm})/K(550 \text{ nm}) < 0.95$      Formula (B)-1':

$1.04 < K(650 \text{ nm})/K(550 \text{ nm}) < 1.35$      Formula (B)-2':

The K value indicates three-dimensional refractive anisotropy of the phase retarder, and depends on the R value and the thickness. The preferred K value also depends on the usage.

The phase retarder of the invention is advantageously used for producing a quarter-wave (λ/4) or half-wave (λ/2) plate having a single optically anisotropic layer. The λ/4 or λ/2 plate produced from the phase retarder of the invention has less wavelength dependence. For that usage, R(550) satisfies the condition of preferably R(550)≧50 nm, more preferably R(550)≧90 nm. Particularly for the λ/4 plate, R(550) preferably satisfies the condition of 100 nm≦R(550)≦180 nm. Also particularly for the λ/2 plate, R(550) preferably satisfies the condition of 220 nm≦R(550)≦330 nm. The phase retarder of the invention, therefore, preferably gives the retardation values at 450 nm and 550 nm satisfying the formula (A)-1 and R(550) of 50 nm or more.

The phase retarder of the invention can be combined with a polarizing membrane to produce an elliptically polarizing plate. Further, the combination of the phase retarder and the polarizing membrane enlarges the viewing angle of a liquid crystal display. The elliptically polarizing plate and the liquid crystal display equipped with the phase retarder of the invention are described below.

[Elliptically Polarizing Plate]

The phase retarder of the invention and a polarizing membrane are laminated to produce an elliptically polarizing plate. The elliptically polarizing plate comprising the phase retarder can enlarge the viewing angle of liquid crystal display.

Examples of the polarizing membrane include an iodine polarizing membrane, a polyene polarizing membrane and a dichromatic dye polarizing membrane. The iodine polarizing membrane and the dye polarizing membrane are generally prepared from polyvinyl alcohol films. The polarizing membrane has a polarizing axis perpendicular to the stretching direction.

The polarizing membrane is laminated on the optically anisotropic layer-side of the phase retarder. A trans-parent protective film is preferably laminated on the polarizing membrane on the side opposite to the phase retarder. The transparent protective film preferably has a transmittance of 80% or more. The transparent protective film is made of generally cellulose ester, preferably cellulose triacetate. The film of cellulose ester is preferably prepared according to the solvent-cast method. The transparent protective film preferably has a thickness of preferably 20 to 500 μm, more preferably 50 to 200 μm.

[Liquid Crystal Display]

The phase retarder enlarges the viewing angle of liquid crystal display. Japanese Patent Provisional Publication No. 6(1994)-214116, U.S. Pat. Nos. 5,583,679 and 5,646,703 and German Patent Publication No. 3911620A1 disclose the phase retarder (optical compensatory sheet) for liquid crystal cell of TN mode. Japanese Patent Provisional Publication No. 10(1998)-54982 describes the optical compensatory sheet for liquid crystal cell of IPS or FLC mode. U.S. Pat. No. 5,805,253 and PCT Publication No. WO96/37804 show the optical compensatory sheet for liquid crystal cell of OCB or HAN mode. Japanese Patent Provisional Publication No. 9(1997)-26572 shows the optical compensatory sheet for liquid crystal cell of STN mode. Japanese Patent No. 2,866,372 describes the optical compensatory sheet for liquid crystal cell of VA mode.

In accordance with the above publications, the phase retarder (optical compensatory sheet) of the invention can be applied for liquid crystal displays of various modes. Examples of the modes include TN (twisted nematic) mode, IPS (in-plane switching) mode, FLC (ferroelectric liquid crystal) mode, OCB (optically compensatory bend) mode, STN (super twisted nematic) mode, VA (vertically aligned) mode and HAN (hybrid aligned nematic) mode. In Japanese Patent Provisional Publication No. 2004-46163, for example, a phase retarder giving inverse wavelength distribution is used in a cell of VA mode. Accordingly, the phase retarder prepared from the liquid crystal composition of the invention, which gives inverse wavelength distribution, is expected to have the same effect as described in the publication when used in a cell of VA mode.

A liquid crystal display comprises a liquid crystal cell, a polarizing element and a phase retarder (optical compensatory sheet). The polarizing element generally comprises a polarizing membrane and a protective film. The polarizing membrane and the protective film may be the same as those described above for the elliptically polarizing plate.

EXAMPLE 1

The compound G-1 can be synthesized according to the following reaction scheme.

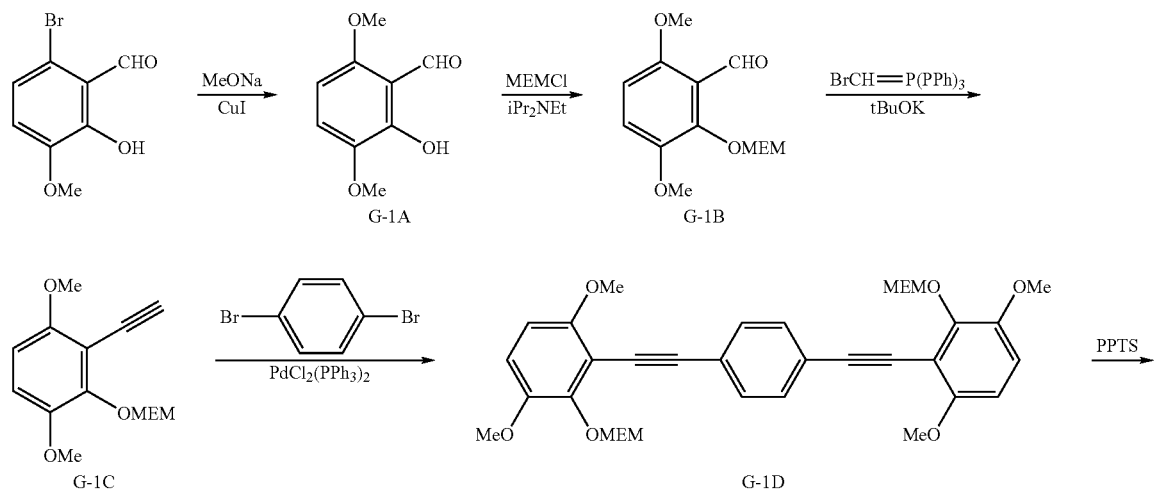

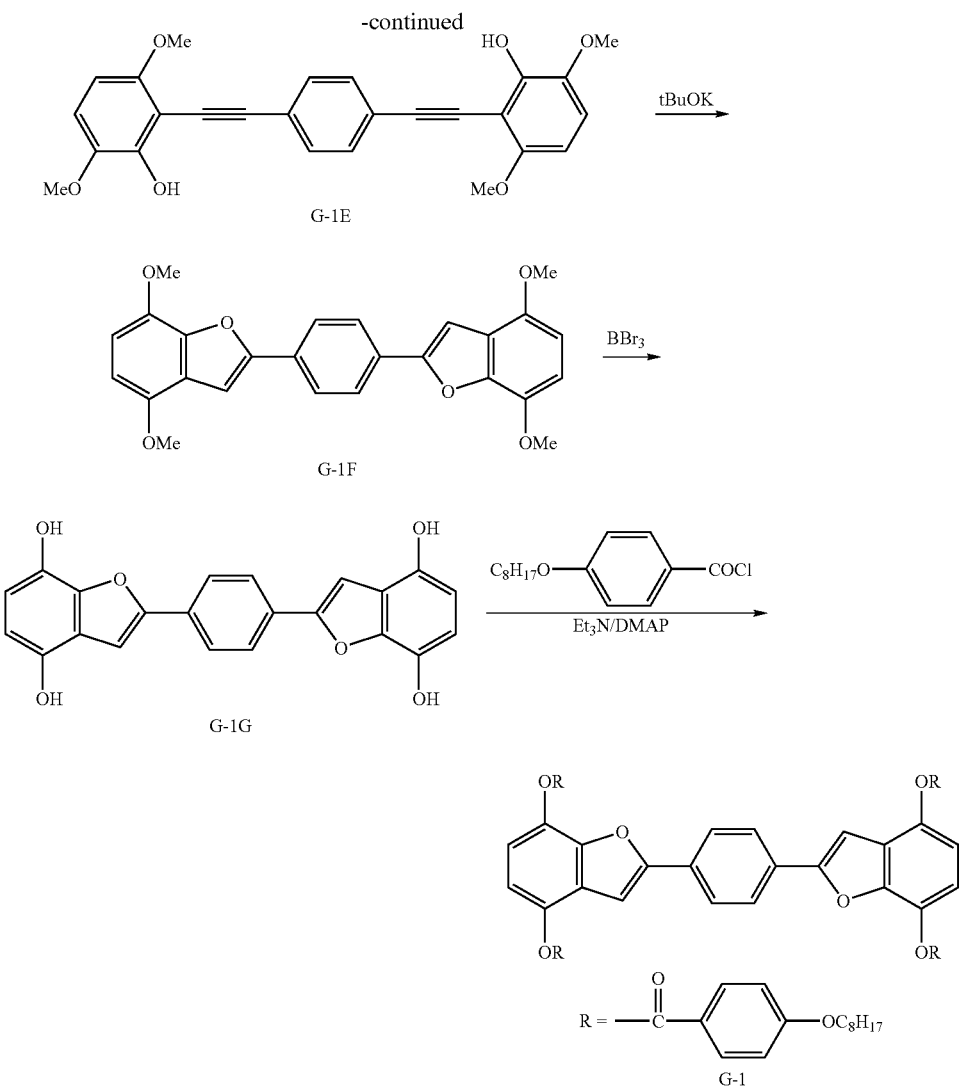

(Synthesis of G-1A)

After 10.2 g of 6-bromo-2-hydroxy-3-methoxybenzaldehyde was dissolved in 40 ml of dimethylformamide, 50 g of sodium methoxide (28% methanol solution) and 0.8 g of copper iodide were added. The solution was stirred at 95° C. for 8 hours, and cooled. After water was added, the reaction liquid was extracted with ethyl acetate. The organic portion was collected and the solvent was distilled away under reduced pressure. Thus, 7.4 g of crystalline G-1A was obtained.

(Synthesis of G-1B)

To 7.4 g of G-1A and 11 ml of diisopropylethylamine, 100 ml of dichloromethane was added. While the solution was kept at a temperature of 30° C. or below, 7.0 ml of 2-methoxyethoxymethylchloride (MEMCl) was dropwise added. After the obtained solution was stirred for 5 hours, water was added. The reaction liquid was then extracted with dichloromethane. The organic portion was collected and the solvent was distilled away under reduced pressure. The obtained crude product was purified through a column chromatograph, to obtain 10.0 g of G-1B.

(Synthesis of G-1C)

After 27.5 g of bromomethyltriphenylphosphoniumbromide was suspended in 100 ml of tetrahydrofuran, 10.5 g of t-BuOK was added. The reaction liquid was stirred for 1 hour, and then 8.5 g of G-1B dissolved in 30 ml of tetrahydrofuran was dropwise added. The liquid was further stirred for 2 hours at room temperature, and then 13 g of t-BuOK was further added. After the obtained liquid was stirred for 1 hour at 50° C., water was added. The reaction liquid was then extracted with ethyl acetate. The organic portion was collected and the solvent was distilled away under reduced pressure to obtain crude product, which was purified through a column chromatograph to obtain 3.2 g of G-1C.

(Synthesis of G-1D)

In 100 ml of triethylamine, 2.6 g of G-1C, 1.05 g of 1,4-dibromobenzene, 100 mg of triphenylphosphine, 50 mg of bis(triphenylphosphine)palladium(II) dichloride and 10 mg of copper(I) iodide were dissolved. The solution was then refluxed for 10 hours under nitrogen gas atmosphere, and cooled. After water was added, the reaction liquid was extracted with ethyl acetate and washed with a saturated NaCl aqueous solution. The organic portion was collected and the solvent was distilled away under reduced pressure. The obtained crude product was purified through a column chromatograph, to obtain 2.8 g of G-1D.

(Synthesis of G-1E)

In 100 ml of ethanol, 2.8 g of G-1D and 0.6 g of pyridiniumparatoluenesufonic acid (PPTS) were dissolved. The solution was then refluxed for 12 hours under nitrogen gas atmosphere, and cooled. After water was added, the reaction liquid was extracted with ethyl acetate and washed with a saturated NaCl aqueous solution. The organic portion was collected and the solvent was distilled away under reduced pressure, to obtain 1.9 g of G-1E.

(Synthesis of G-1F)

In 70 ml of ethanol, 1.9 g of G-1E and 1.5 g of t-BuOK were dissolved. The solution was then refluxed for 12 hours under nitrogen gas atmosphere, and cooled. The formed precipitate was collected by filtration, and dried to obtain 1.6 g of G-1F.

(Synthesis of G-1G)

In 100 ml of dichloromethane, 1.6 g of G-1F was dissolved. To the solution, 100 ml of boron tribromide (1.0 M dichloromethane solution) was added. The resultant solution was then refluxed for 10 hours, and cooled. After water was added, the formed precipitate was collected by filtration and dried to obtain 1.1 g of G-1G.

(Synthesis of G-1)

After 0.1 g of G-1G and 0.43 g of 4-octyloxybenzoyl chloride were dissolved in 10 ml of tetrahydrofuran, 0.25 ml of triethylamine and 0.01 g of 1,4-dimethylaminopyridine were added. The resultant solution was refluxed for 12 hours at room temperature, and then 100 ml of methanol was added. The formed precipitate was collected by filtration, and purified through a column chromatograph to obtain 0.25 g of G-1. The NMR spectrum of the obtained G-1 was as follows.

$^1$H NMR (solvent: CDCl$_3$, standard: tetramethylsilane) δ (ppm): 0.91 (12H, t), 1.20-1.40 (32H, m), 1.40-1.60 (8H, m), 1.80-1.90 (8H, m), 4.07 (8H, t), 7.01 (10H, m), 7.12 (2H, d), 7.19 (2H, d), 7.78 (4H, s), 8.22 (4H, d), 8.27 (4H, d)

The phase transition temperature of the obtained G-1 was determined by observation of texture with a polarizing microscope. As a result, according as the temperature rose, the crystal phase changed into nematic phase at about 210° C. and the isotropic liquid phase appeared above 250° C. In this way, it was confirmed that the compound G-1 forms nematic phase in the temperature range of 210° C. to 250° C.

[Measurement of Wavelength Distribution]

At 260° C., a wedged liquid crystal cell (N-Wedge NLCD-057, Nippo Denki Co., Ltd.) was filled with G-1. The Δn at each wavelength of 450 nm, 550 nm and 650 nm was measured at 220° C., and thereby it was found that Δn(450 nm), Δn(550 nm) and Δn(650 nm) were 0.055, 0.060 and 0.063, respectively. It was, therefore, found that the values Δn(450 nm)/Δn(550 nm) and Δn(650 nm)/Δn(550 nm) were Δn(450 nm)/Δn(550 nm)=0.92 and Δn(650 nm)/Δn(550 nm)=1.05, respectively.

EXAMPLE 2

The compound G-3 can be synthesized according to the following reaction scheme.

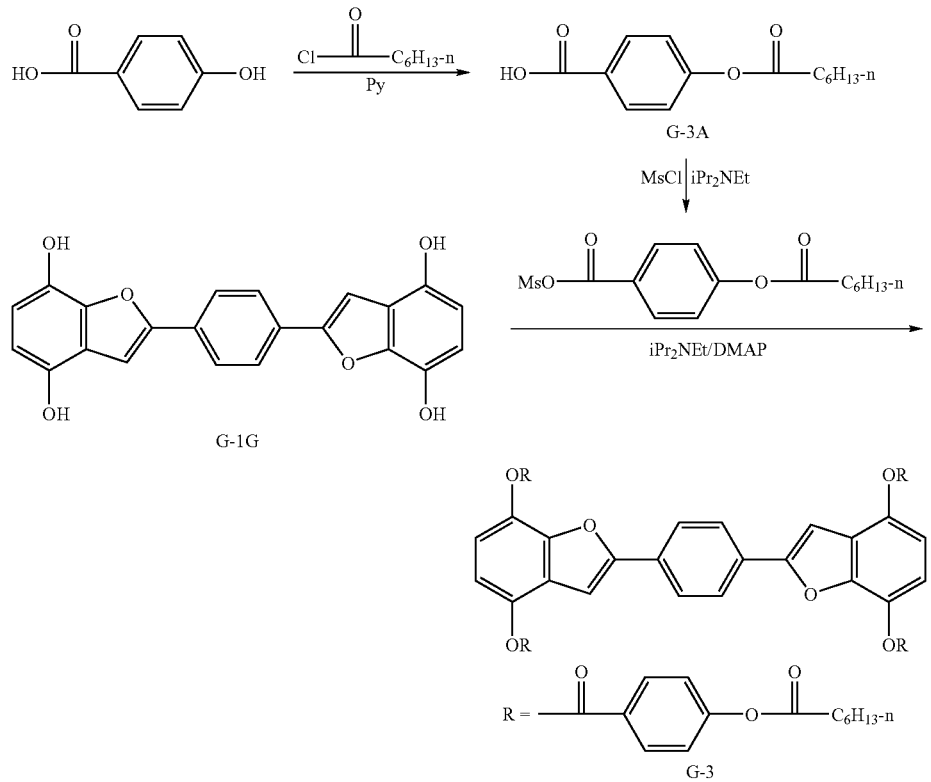

(Synthesis of G-3A)

To 11.7 g of p-hydroxybezoic acid and 17.2 ml of pyridine (Py), 85 ml of tetrahydrofuran (THF) was added. While the solution was kept at a temperature of 10° C. or below, 16.4 g of heptanoyl chloride was dropwise added. After the obtained solution was stirred for 12 hours at room temperature, 20 ml of water was added and then the solution was further stirred for 1 hour. After 500 ml of water was added, the formed precipitate was collected by filtration, washed with hot water and hot hexane, and dried to obtain 5.6 g of crystalline G-3A.

(Synthesis of G-3)

In 15 ml of tetrahydrofuran, 0.176 ml of methanesulfonyl chloride was dissolved. The solution was cooled at 0° C., and 15 ml of tetrahydrofuran solution containing 0.57 g of G-3A and 0.40 ml of diisopropylethylamine was dropwise added. After the obtained solution was stirred at 0° C. for 1 hour, 0.40 ml of diisopropylethylamine and 0.02 g of 4-dimethylaminopyridine were added. Sequentially, 10 ml of tetrahydrofuran solution containing 0.10 g of G-1C prepared according to Example 1 was added. The solution was then stirred at room temperature for 12 hours, and water was added. The reaction liquid was extracted with dichloromethane. After condensed under reduced pressure, the crude product was purified through a column chromatograph to obtain 0.10 g of crystalline G-3. The NMR spectrum of the obtained G-3 was as follows.

$^1$H NMR (solvent: CDCl$_3$, standard: tetramethylsilane) δ (ppm): 0.92 (12H, t), 1.30-1.45 (16H, m), 1.40-1.60 (8H, m), 1.78-1.88 (8H, m), 2.63 (8H, t), 7.01 (2H, s), 7.16 (2H, d), 7.22 (2H, d), 7.28 (8H, d), 7.82 (4H, s), 8.33 (4H, d), 8.36 (4H, d)

The phase transition temperature of the obtained G-3 was determined by observation of texture with a polarizing microscope. As a result, according as the temperature rose, the crystal phase changed into nematic phase at about 262° C. and the isotropic liquid phase appeared above 300° C. In this way, it was confirmed that the compound G-3 forms nematic phase in the temperature range of 262° C. to 300° C.

EXAMPLE 3

The compound G-2 can be synthesized according to the following reaction scheme.

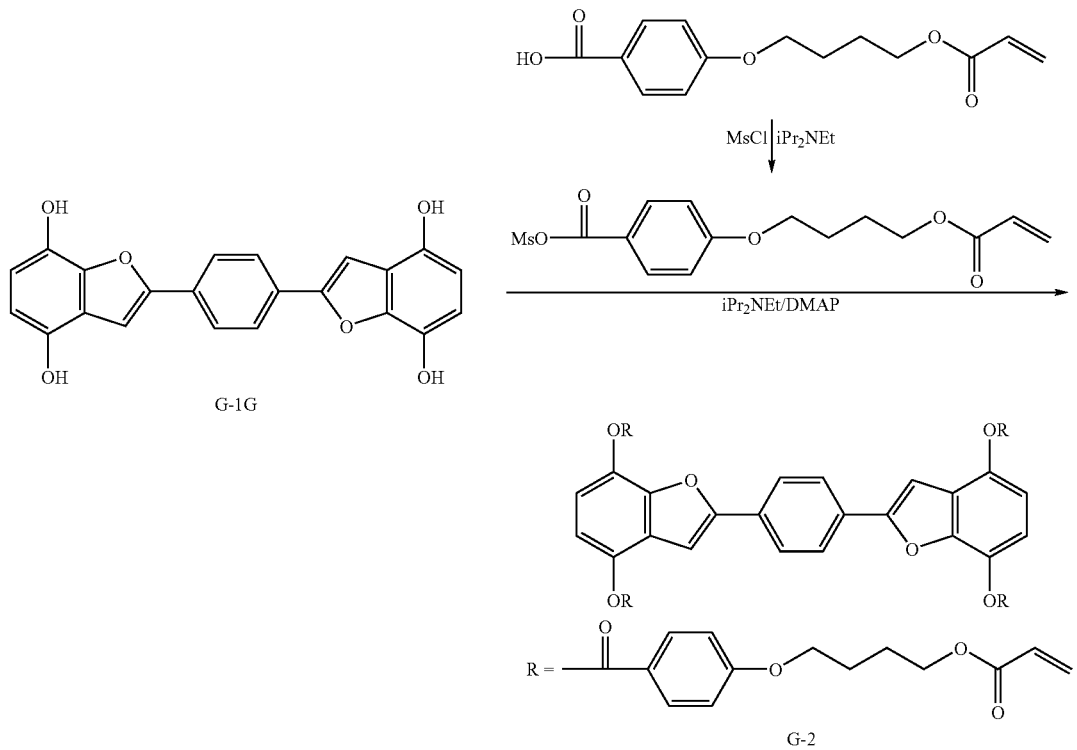

In 10 ml of tetrahydrofuran, 0.43 g of methanesulfonyl chloride was dissolved. The solution was cooled at 0° C., and 10 ml of tetrahydrofuran solution containing 1.0 g of 4-(4-acryloyloxybutyloxy)benzoic acid and 0.51 g of diisopropylethylamine was dropwise added. After the obtained solution was stirred at 0° C. for 1 hour, 0.51 g of diisopropylethylamine and 0.02 g of 4-dimethylaminopyridine were added. Sequentially, 10 ml of tetrahydrofuran solution containing 0.14 g of G-1G prepared according to Example 1 was added. After the solution was stirred at room temperature for 12 hours, 100 ml of methanol was added. The formed precipitate was collected by filtration, dried, and purified through a column chromatograph to obtain 0.22 g of crystalline G-2. The NMR spectrum of the obtained G-2 was as follows.

$^1$H NMR (solvent: CDCl$_3$, standard: tetramethylsilane) δ (ppm): 1.90-2.00 (16H, m), 4.12-4.16 (8H, m), 4.27-4.31 (8H, m), 5.83 (4H, dd), 6.13 (4H, dd), 6.42 (4H, dd), 6.98 (2H, s), 7.01 (4H, d), 7.03 (4H, d), 7.14 (2H, d), 7.20 (2H, d), 7.78 (4H, s), 8.24 (4H, d), 8.26 (4H, d)

The phase transition temperature of the obtained G-2 was determined by observation of texture with a polarizing microscope. As a result, according as the temperature rose, the crystal phase changed into nematic phase at about 180° C. and the isotropic liquid phase appeared above 250° C. In this way, it was confirmed that the compound G-2 forms nematic phase in the temperature range of 180° C. to 250° C.

[Measurement of Wavelength Distribution]

(Preparation of Alignment Layer)

In 0.5 ml of chloroform, 50 mg of G-2 and 0.2 mg of the following additive SH-1 were dissolved. The prepared solution was spread by spin-coating to coat an alignment layer-provided glass plate prepared in Example 11 (described later). The thus-obtained sample was heated on a hot-stage (MP200-DMSH, KITAZATO SUPPLY Co., Ltd.) at 190° C., and the retardation was measured with a KOBRA-WR (OJI SCIENTIFIC INSTRUMENTS CO., LTD.). Independently, the thickness was measured, and from the obtained values the Δn was calculated. As a result, it was found that Δn(450 nm), Δn(550 nm) and Δn(650 nm) were 0.057, 0.063 and 0.066, respectively. It was, therefore, found that the values Δn(450 nm)/Δn(550 nm) and Δn(650 nm)/Δn(550 nm) were Δn(450 nm)/Δn(550 nm)=0.91 and Δn(650 nm)/Δn(550 nm)=1.05, respectively.

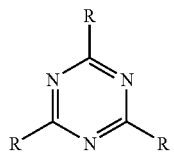

(SH-1)

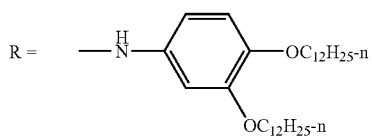

EXAMPLE 4

The compound G-43 can be synthesized according to the following reaction scheme.

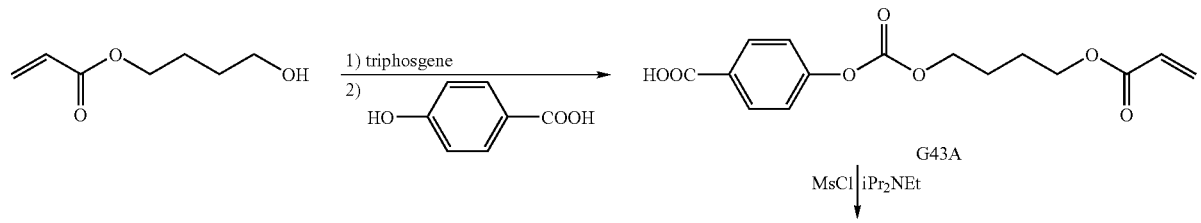

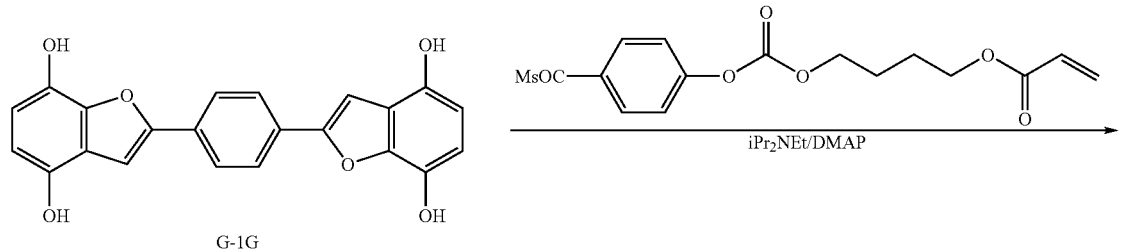

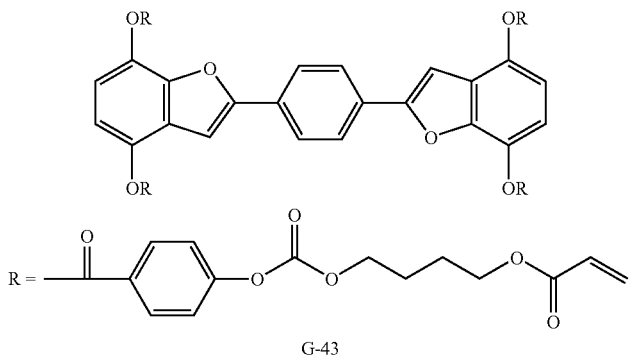

(Synthesis of G-43A)

In 400 ml of tetrahydrofuran, 17.6 g of 4-hydoxybutyl acrylate and 13.5 g of N,N-dimethylaniline were dissolved. While the solution was kept at a temperature of 15° C. or below, 11.0 g of triphosgene dissolved in 200 ml of tetrahydrofuran was dropwise added. After the resultant solution was stirred at room temperature for 2 hours, 11.8 g of p-hydroxybenzoic acid wad added. The solution was then cooled to 15° C. or below. While the solution was kept at a temperature of 15° C. or below, 31 ml of pyridine was added. The solution was again stirred for 12 hours at room temperature, and then 100 ml of water was added. The solution was further stirred for 1 hour at room temperature, and then poured into 2 L of water. The formed precipitate was collected by filtration, and re-crystallized from acetonitrile/water. The obtained crude product was dissolved in a mixture of ethyl acetate/hexane, and extracted with aqueous solution of N-methylmorpholine. The aqueous portion was collected, and hydrochloric acid was added to precipitate crystallites. The precipitated crystallites were collected by filtration, and dried to obtain 14.0 g of crystalline G-43A.

(Synthesis of G-43)

In 5 ml of tetrahydrofuran, 0.18 g of methanesulfonyl chloride was dissolved. The solution was cooled at 0° C., and 10 ml of tetrahydrofuran solution containing 0.50 g of G-43A and 0.22 g of diisopropylethylamine was dropwise added. After the obtained solution was stirred at 0° C. for 1 hour, 0.22 g of diisopropylethylamine and 0.01 g of 4-dimethylaminopyridine were added. Sequentially, 10 ml of tetrahydrofuran solution containing 0.06 g of G-1C prepared according to Example 1 was added. The solution was then stirred at room temperature for 12 hours, and 50 ml of methanol was added to precipitate crystallites. The precipitated crystallites were collected by filtration, dried and purified through a column chromatograph to obtain 0.11 g of crystalline G-43. The NMR spectrum of the obtained G-43 was as follows.

$^1$H NMR (solvent: CDCl$_3$, standard: tetramethylsilane) δ (ppm): 1.85-2.00 (16H, m), 4.22-4.28 (8H, m), 4.35-4.40 (8H, m), 5.85 (4H, dd), 6.15 (4H, dd), 6.43 (4H, dd), 7.01 (2H, s), 7.16 (2H, d), 7.22 (2H, d), 7.42 (8H, d), 7.82 (4H, s), 8.35 (4H, d), 8.38 (4H, d)

The phase transition temperature of the obtained G-43 was determined by observation of texture with a polarizing microscope. As a result, according as the temperature rose, the crystal phase changed into isotropic liquid phase at about 252° C. According as the temperature then went down, the isotropic liquid phase changed into nematic phase at about 250° C. When the temperature fell to about 235° C., the crystal phase appeared. In this way, it was confirmed that the compound G-43 forms nematic phase in the temperature range of 250° C. to 235° C.

EXAMPLE 5

The compound G-34 can be synthesized according to the following reaction scheme.

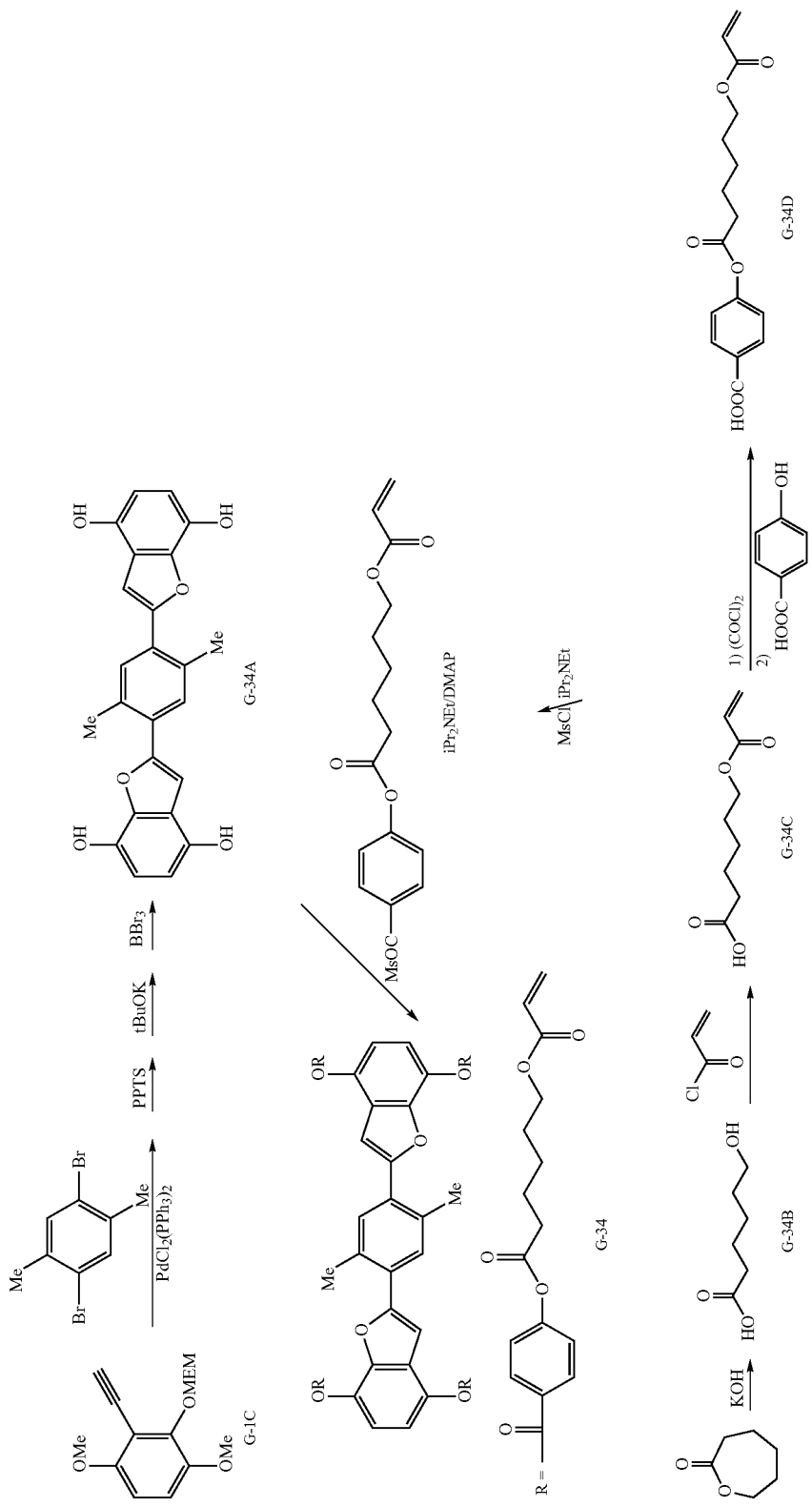

(Synthesis of G-34A)

From the compound G-1C obtained according to Example 1 and 2,5-dibromo-p-xylene, the compound G-34A was synthesized in the same manner as in Example 1.

(Synthesis of G-34B)

To 168 g of KOH, 380 ml of tetrahydrofuran and 130 ml of methanol were added. To the mixture, 116 g of ε-caprolactone was dropwise added. After the resulting solution was stirred at room temperature for 12 hours, hydrochloric acid was added to acidify the solution. The obtained solution was then extracted with ethyl acetate, and the solvent was distilled away to obtain 87 g of G-34B.

(Synthesis of G-34C)

To 35 g of G-34B, 200 ml of dimethylacetamide was added. While the mixture was kept at a temperature of 30° C. or below, 54 ml of acryloyl chloride was dropwise added. The solution was then stirred for 3 hours, and 40 ml of pyridine and 40 ml of water were added while the solution was kept at a temperature of 30° C. or below. The obtained solution was stirred at room temperature for 2 hours, and diluted hydrochloric acid was added. The resultant liquid was then extracted with ethyl acetate, and the solvent was distilled away to obtain 36 g of G-34C.

(Synthesis of G-34D)

In 50 ml of dichloromethane, 9.69 g of G-34C was dissolved. To the solution, 3.88 ml of oxazolyl chloride was added. The obtained solution was stirred at room temperature for 12 hours, and the solvent was distilled away to obtain an acyl chloride. The acyl chloride was then dissolved in 20 ml of tetrahydrofuran, and the obtained solution was dropped at 5° C. or below into another solution in which 25.3 g of p-hydroxybenzoic acid and 5.8 ml of pyridine were dissolved in 50 ml of tetrahydrofuran. After the obtained mixture was stirred at room temperature for 12 hours, 10 ml of pyridine and 10 ml of water were dropwise added. The solution was again stirred at room temperature for 2 hours. After diluted hydrochloric acid was added, the solution was extracted with ethyl acetate and the solvent was distilled away to prepare crude product. The crude product was purified through a column chromatograph, to obtain 3.21 g of crystalline G-34D.

(Synthesis of G-34)

In 5 ml of tetrahydrofuran, 0.23 g of methanesulfonyl chloride was dissolved. The solution was cooled at 0° C., and 15 ml of tetrahydrofuran solution containing 0.50 g of G-34D and 0.58 ml of diisopropylethylamine was dropwise added. After the obtained solution was stirred at 0° C. for 1 hour, 0.58 ml of diisopropylethylamine and 0.01 g of 4-dimethylaminopyridine were added. Sequentially, 10 ml of tetrahydrofuran solution containing 0.10 g of G-34A was added. The resultant solution was stirred at room temperature for 12 hours, and 50 ml of methanol was added to precipitate crystallites. The precipitated crystallites were collected by filtration, dried and purified through a column chromatograph, to obtain 0.10 g of crystalline G-34. The NMR spectrum of the obtained G-34 was as follows.

$^1$H NMR (solvent: $CDCl_3$, standard: tetramethylsilane) δ (ppm): 1.50-1.60 (8H, m), 1.75-1.90 (16H, m), 2.52 (6H, s), 2.65 (8H, t), 4.21 (8H, t), 5.83 (4H, dd), 6.12 (4H, dd), 6.42 (4H, dd), 6.87 (2H, s), 7.16 (2H, d), 7.22 (2H, d), 7.28 (8H, d), 7.62 (4H, s), 8.31 (8H, d)

The phase transition temperature of the obtained G-34 was determined by observation of texture with a polarizing microscope. As a result, according as the temperature rose, the crystal phase changed into nematic phase at about 185° C. and the isotropic liquid phase appeared above 192° C. In this way, it was confirmed that the compound G-34 forms nematic phase in the temperature range of 185° C. to 192° C.

[Measurement of Wavelength Distribution]

(Preparation of Alignment Layer)

In 0.5 ml of chloroform, 50 mg of G-34 and 0.2 mg of the above additive SH-1 were dissolved. The prepared solution was spread by spin-coating to coat an alignment layer-provided glass plate prepared in Example 11 (described later). The thus-obtained sample was heated on a hot-stage (MP200-DMSH, KITAZATO SUPPLY Co., Ltd.) at 190° C., and the retardation was measured with a KOBRA-WR (OJI SCIENTIFIC INSTRUMENTS CO., LTD.). Independently, the thickness was measured, and from the obtained values the Δn was calculated. As a result, it was found that Δn(450 nm), Δn(550 nm) and Δn(650 nm) were 0.052, 0.058 and 0.061, respectively. It was, therefore, found that the values Δn(450 nm)/Δn(550 nm) and Δn(650 nm)/Δn(550 nm) were Δn(450 nm)/Δn(550 nm)=0.90 and Δn(650 nm)/Δn(550 nm)=1.05, respectively.

EXAMPLE 6

The compound G-50 can be synthesized according to the following reaction scheme.

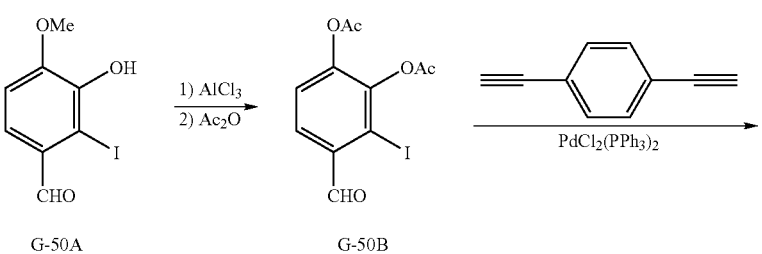

-continued
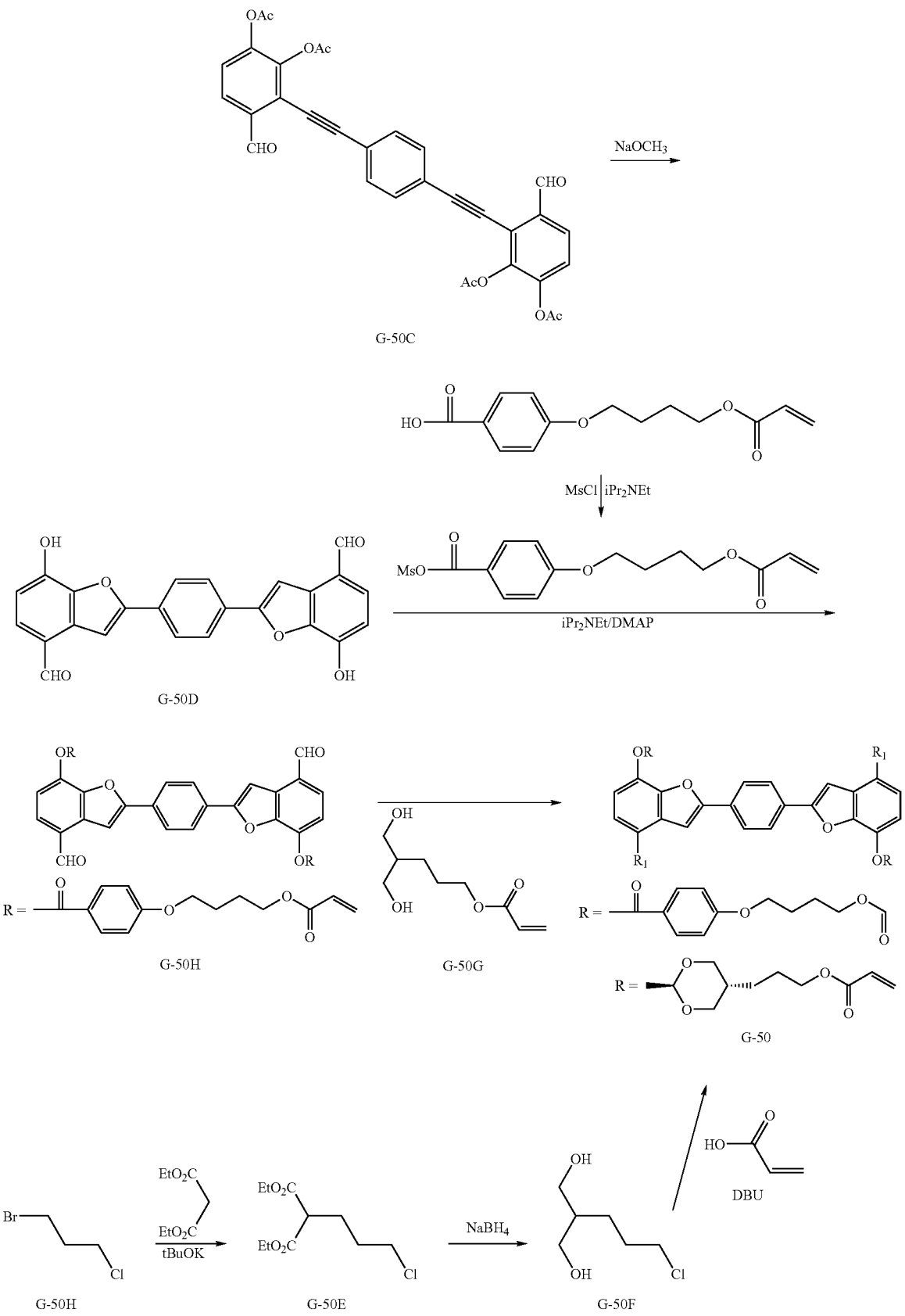
G-50C
G-50D
G-50H
G-50G
G-50
G-50H
G-50E
G-50F (Synthesis of G-50B)

In 100 ml of 1,2-dichloroethane, 10 g of G-50A synthesize according to J. Med. Chem., vol. 35, pp. 466 (1992) was dissolved. To the solution, 6.0 g of aluminum chloride and 12.7 ml of pyridine were added. The mixture was then stirred at 60° C. for 4 hours. After diluted hydrochloric acid was added, the solution was extracted with ethyl acetate and the solvent was distilled away. To the obtained crystallites, 50 ml of pyridine and 10 ml of acetic anhydride were added. The resultant mixture was again stirred at room temperature for 12 hours, and then cool water was added to precipitate crystallites. The crystallites were collected by filtration, and dried to obtain 8.5 g of crystalline G-50B.

(Synthesis of G-50C)

To a mixture of 3.9 g of G-50B, 0.67 g of 1,4-diethynyl-benzene, 0.20 g of bis(triphenylphosphine)-palladium(II) dichloride and 52 mg of copper(I) iodide, 80 ml of triethylamine and 30 ml of dimethylformamide were added. The obtained liquid was stirred at 70° C. for 5 hours under nitrogen gas atmosphere, and cooled to precipitate crystallites. The crystallites were collected by filtration, washed with methanol, and dried to obtain 1.3 g of crystalline G-50C.

(Synthesis of G-50D)

To 1.30 g of G-50C, 200 ml of ethanol and 10 ml of sodium methoxide (28% methanol solution) were added. The mixture was then stirred at 60° C. for 1 hour, and refluxed for 6 hours. After the reaction liquid was cooled at 50° C. to precipitate crystallites, water was added until the crystallites were dissolved. To the solution, hydrochloric acid was added to precipitate crystallites again. The crystallites were collected by filtration, and dried to obtain 0.8 g of crystalline G-50D.

(Synthesis of G-50E)

In 100 ml of ethanol, 16.2 g of 1-bromo-3-chloro-propane and 15.0 g of diethyl malonate were dissolved. To the solution, 10.5 g of potassium t-butoxide was added. The obtained mixture was refluxed for 2 days. After the resultant liquid was cooled, diluted hydrochloric acid was added. The reaction liquid was then extracted with ethyl acetate. From the obtained liquid, ethyl acetate was distilled away to obtain crude product. The crude product was then purified through a column chromatograph to obtain 9.0 g of G-50E.

(Synthesis of G-50F)

In 350 ml of methanol, 9.0 g of G-50E was dissolved. The solution was heated to 55° C., and 20 g of sodium borohydride was gradually added. After the liquid was stirred for 1 hour, water was added and methanol was distilled away. The reaction liquid was then extracted with ethyl acetate. From the obtained organic portion, the solvent was distilled away to obtain 5.9 g of G-50F.

(Synthesis of G-50G)

In 150 ml of toluene, 5.9 g of G-50F, 5.6 g of acrylic acid and 11.8 g of DBU were dissolved. The solution was refluxed for 1 hour, cooled, and then extracted with ethyl acetate. The organic portion was collected and the solvent was distilled away to obtain crude product, which was then purified through a column chromatograph to obtain 5.5 g of G-50G.

(Synthesis of G-50H)

In 20 ml of tetrahydrofuran, 1.38 g of methanesulfonyl chloride was dissolved. The solution was cooled to 0° C., and 50 ml of tetrahydrofuran solution containing 3.18 g of 4-(4-acryloyloxybutyloxy)benzoic acid and 2.2 ml of diisopropylethylamine was dropwise added. After the obtained liquid was stirred at 0° C. for 1 hour, 2.2 ml of diisopropylethylamine and 0.02 g of 1,4-dimethylaminopyridine were added. Further, 20 ml of tetrahydrofuran solution containing 0.80 g of G-50C was added. After the resultant liquid was stirred at room temperature for 12 hours, 500 ml of methanol was added to precipitate crystallites. The crystallites were collected by filtration, dried, and purified through a column chromatograph to obtain 1.70 g of crystalline G-50H.

(Synthesis of G-50)

To a mixture of 1.0 g of G-50H, 0.80 g of G-50G and 0.10 g of p-toluenesulfonic acid, 20 ml of 1,2-dichloroethane was added. The obtained liquid was stirred at 100° C. for 1 hour, cooled and purified through a column chromatograph to obtain 0.85 g of crystalline G-50. The NMR spectrum of the obtained G-50 was as follows.

$^1$H NMR (solvent: CDCl$_3$, standard: tetramethylsilane) δ (ppm): 1.20-1.33 (4H, m), 1.70-1.80 (4H, m), 1.90-2.00 (8H, m), 2.20-2.35 (2H, m), 3.68 (4H, t), 4.10-4.40 (16H, m), 5.71 (2H, s), 5.80-5.90 (4H, m), 6.10-6.20 (4H, m), 6.40-6.50 (4H, m), 7.01 (4H, d), 7.16 (2H, d), 7.32 (2H, s), 7.37 (2H, d), 7.83 (4H, s), 8.25 (4H, d)

The phase transition temperature of the obtained G-50 was determined by observation of texture with a polarizing microscope. As a result, according as the temperature rose, the crystal phase changed into isotropic liquid phase at about 175° C. According as the temperature then went down from 180° C., the isotropic liquid phase changed into nematic phase at about 165° C. When the temperature fell to about 120° C., the crystal phase appeared. In this way, it was confirmed that the compound G-50 forms nematic phase in the temperature range of about 165° C. to 120° C. in decreasing the temperature.

[Measurement of Wavelength Distribution]

(Preparation of Alignment Layer)

In 0.5 ml of chloroform, 50 mg of G-50 and 0.2 mg of the above additive SH-1 were dissolved. The prepared solution was spread by spin-coating to coat an alignment layer-provided glass plate prepared in Example 11 (described later). The thus-obtained sample was heated on a hot-stage (MP200-DMSH, KITAZATO SUPPLY Co., Ltd.) at 150° C., and the retardation was measured with a KOBRA-WR (OJI SCIENTIFIC INSTRUMENTS CO., LTD.). Independently, the thickness was measured, and from the obtained values the Δn was calculated. As a result, it was found that Δn(450 nm), Δn(550 nm) and Δn(650 nm) were 0.036, 0.043 and 0.047, respectively. It was, therefore, found that the values Δn(450 nm)/Δn(550 nm) and Δn(650 nm)/Δn(550 nm) were Δn(450 nm)/Δn(550 nm)=0.84 and Δn(650 nm)/Δn(550 nm)=1.09, respectively.

EXAMPLE 7

The compound G-35 can be synthesized according to the following reaction scheme.

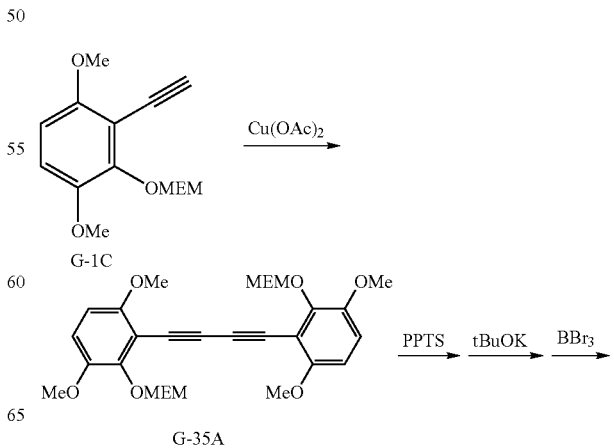

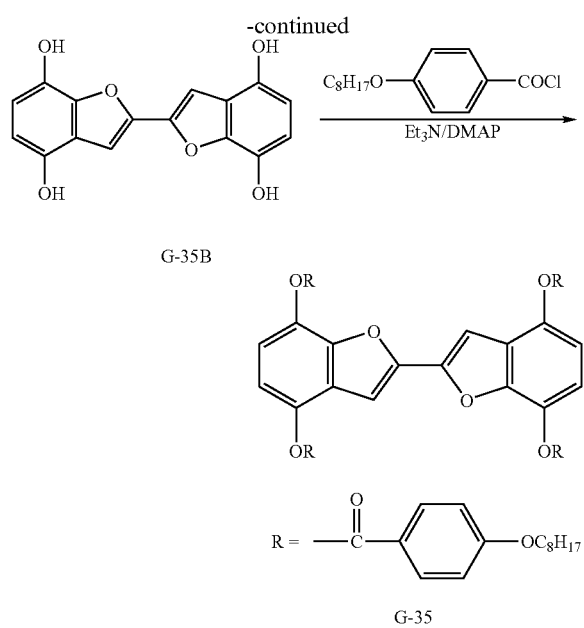

G-35B

G-35

R = —C(=O)—C6H4—OC8H17

(Synthesis of G-35A)

To a mixture of 0.90 g of G-1C prepared according to Example 1 and 1.30 g of copper(II) acetate, 10 ml of pyridine and 5 ml of methanol were added. The obtained liquid was stirred at 60° C. for 3 hours, cooled and extracted with ethyl acetate. The organic portion was collected and the solvent was distilled away to obtain crude product, which was then purified through a column chromatograph to obtain 0.30 g of G-35A.

(Synthesis of G-35B)

From 0.30 g of G-35A, 0.10 g of G-34B was synthesized in the same manner as in Example 1.

(Synthesis of G-35)

In 10 ml of tetrahydrofuran, 0.1 g of G-35B and 0.60 g of 4-octyloxybenzoyl chloride were dissolved. To the solution, 0.30 ml of triethylamine and 0.01 g of 4-dimethylaminopyridine were added. After the obtained liquid was stirred at room temperature for 12 hours, 100 ml of methanol was added to precipitate crystallites. The crystallites were collected by filtration, and purified through a column chromatograph to obtain 0.15 g of crystalline G-35. The NMR spectrum of the obtained G-35 was as follows.

$^1$H NMR (solvent: CDCl$_3$, standard: tetramethylsilane) δ (ppm): 0.91 (12H, t), 1.25-1.40 (32H, m), 1.40-1.60 (8H, m), 1.80-1.90 (8H, m), 4.05 (8H, t), 6.98 (8H, m), 7.13 (2H, s), 7.14 (2H, d), 7.20 (2H, d), 8.20 (4H, d), 8.23 (4H, d)

The phase transition temperature of the obtained G-35 was determined by observation of texture with a polarizing microscope. As a result, according as the temperature rose, the crystal phase changed into nematic phase at about 280° C. Even when the temperature reached 300° C., the nematic phase was still observed. In this way, it was confirmed that the compound G-35 forms nematic phase in the temperature range of 280° C. to 300° C. or above.

EXAMPLE 8

The compound G-51 can be synthesized according to the following reaction scheme.

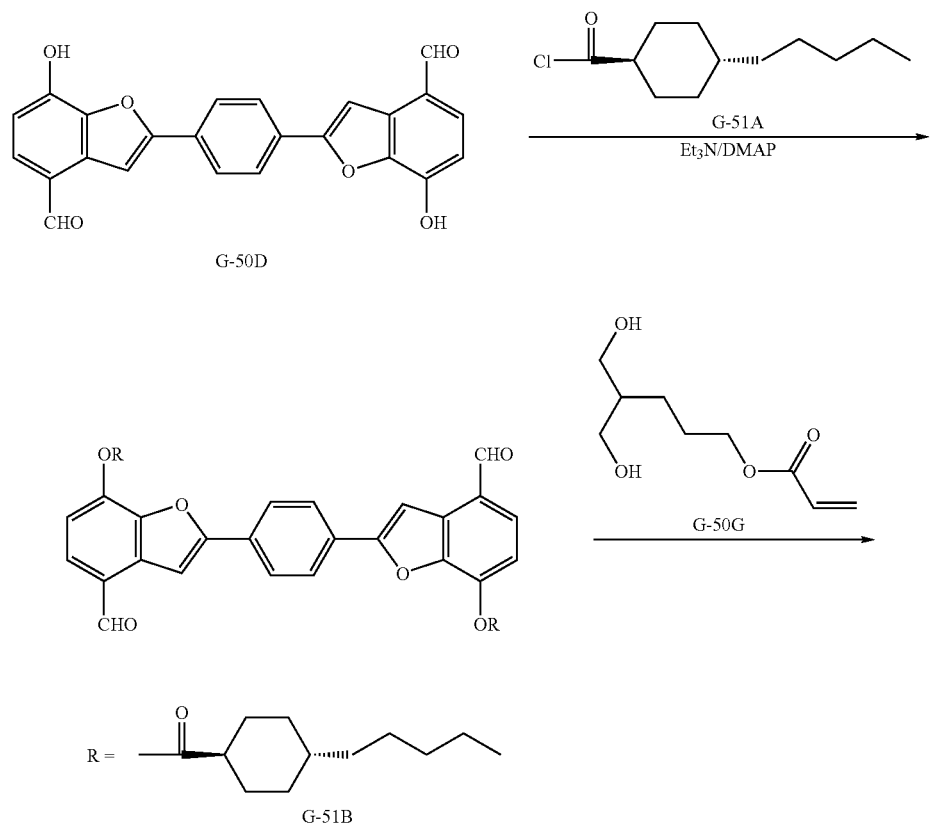

G-50D

G-51A

G-50G

G-51B

-continued

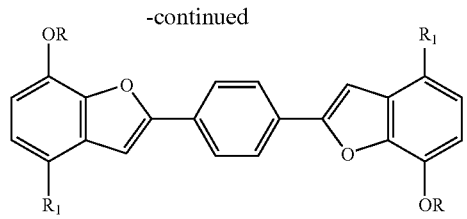

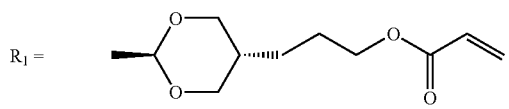

G-51

(Synthesis of G-51B)

To a mixture of 0.06 g of G-50D prepared according to Example 6 and 0.30 g of G-51A prepared from commercially available trans-4-n-cyclohexylcarboxylic acid in the known manner, 5 ml of tetrahydrofuran was added. To the solution, 0.18 ml of triethylamine and 0.01 g of dimethylaminopyridine were added. After the obtained liquid was stirred for 12 hours, 5 ml of dichloromethane was added. The reaction liquid was poured into 300 ml of methanol, to precipitate crystallites. The crystallites were collected by filtration, and dried to obtain 0.07 g of G-51B.

(Synthesis of G-51)

From G-51B and G-50G, 0.10 g of G-51 was obtained in the same manner as in Example 6. The NMR spectrum of the obtained G-51 was as follows.

$^1$H NMR (solvent: CDCl$_3$, standard: tetramethylsilane) δ (ppm): 0.91 (6H, t), 1.00-1.15 (4H, m), 1.20-1.40 (22H, m), 1.60-1.80 (8H, m), 1.90-2.00 (4H, m), 2.20-2.35 (6H, m), 2.60-2.70 (2H, m), 3.65 (4H, t), 4.20 (4H, t), 4.34 (4H, dd), 5.68 (2H, s), 5.87 (2H, dd), 6.15 (2H, dd), 6.45 (2H, dd), 7.02 (2H, d), 7.31 (2H, d), 7.32 (2H, s), 7.90 (4H, s)

The phase transition temperature of the obtained G-51 was determined by observation of texture with a polarizing microscope. As a result, according as the temperature rose, the crystal phase changed into isotropic liquid phase at about 225° C. The compound G-51 did not behave as liquid crystal.

COMPARISON EXAMPLE 1

(Comparison with Normal Rod-Like Liquid Crystal Compound)

At 210° C., a wedged liquid crystal cell (N-Wedge NLCD-057, Nippo Denki Co., Ltd.) was filled with the following rod-like liquid crystal compound B-1, which can be synthesized in the known manner. The Δn at each wavelength of 450 nm, 550 nm and 650 nm was measured at 150° C., and thereby it was found that Δn(450 nm), Δn(550 nm) and Δn(650 nm) were 0.126, 0.111 and 0.108, respectively. It was, therefore, found that the values Δn(450 nm)/Δn(550 nm) and Δn(650 nm)/Δn(550 nm) were Δn(450 nm)/Δn(550 nm)=1.14 and Δn(650 nm)/Δn(550 nm)=0.97, respectively.

B-1

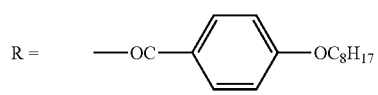

COMPARISON EXAMPLE 2

(Comparison with Liquid Crystal Compound Having Tolan Skeleton)

The compound B-2 can be synthesized according to the following reaction scheme.

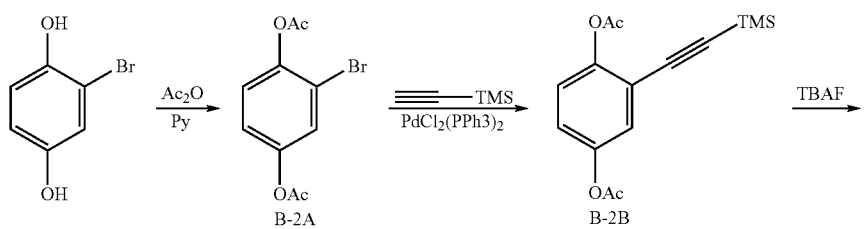

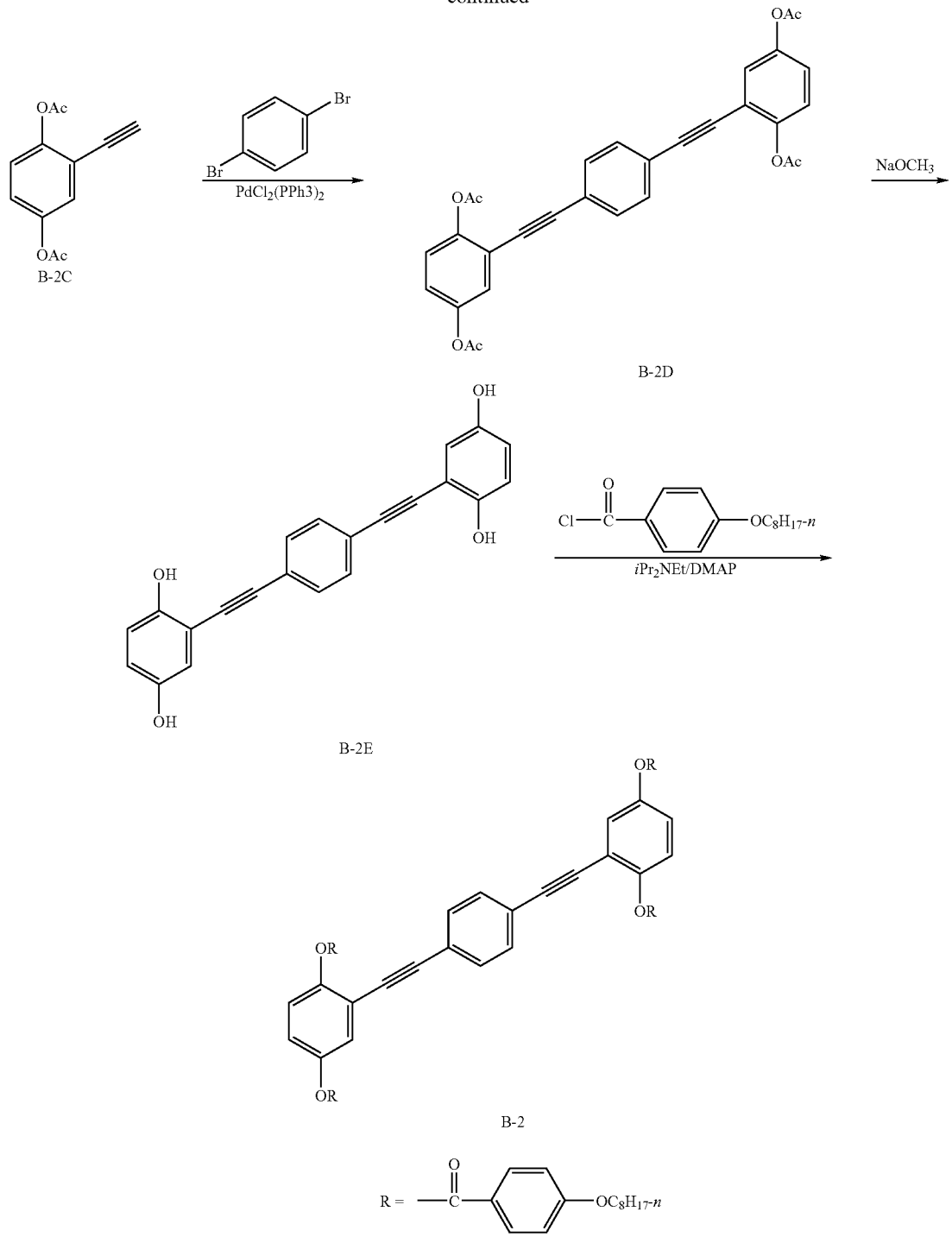

(Synthesis of B-2A)

In 70 ml of pyridine (Py), 25.0 g of bromohydroquinone was dissolved. While the solution was kept at a temperature of 50° C. or below, 37 ml of acetic anhydride ($Ac_2O$) was dropwise added. After the solution was stirred for 3 hours, water was added. The reaction liquid was then extracted with ethyl acetate. The obtained organic portion was washed with saturated aqueous solution of sodium bicarbonate, diluted hydrochloric acid, water and saturated NaCl aqueous solution, successively. After the solvent was distilled away, hexane was added to precipitate 32.2 g of crystalline B-2A.

(Synthesis of B-2B)

In 200 ml of triethylamine, 32.2 g of B-2A, 17.4 g of trimethylsilyl (TMS) acetylene, 0.5 g of triphenylphosphine, 0.25 g of bis(triphenylphosphine)palladium(II) dichloride and 80 mg of copper(I) iodide were dissolved. The solution was then refluxed for 10 hours under nitrogen gas atmosphere, and cooled to precipitate triethylamine hydrochloride. After the precipitate was filtered off, the solvent was distilled away from the organic filtrate under reduced pressure. The obtained residue was purified through a column chromatograph, to obtain 32.0 g of crystalline B-2B.

(Synthesis of B-2C)

In 200 ml of tetrahydrofuran, 32.0 g of B-2B was dissolved. To the solution, 120 m of 1.0 M tetrahydrofuran solution of tetrabutylammonium fluoride (TBAF) was added. The obtained liquid was stirred a room temperature for 30 minutes, and water was added. The reaction liquid was extracted with ethyl acetate, and the organic portion was washed with a saturated NaCl aqueous solution. The organic portion was collected and the solvent was distilled away under reduced pressure to obtain crude product, which was then purified through a column chromatograph to obtain 20.5 g of crystalline B-2C.

(Synthesis of B-2D)

In 23 ml of triethylamine, 3.0 g of B-2C, 1.38 g of 1,4-dibromobenzene, 58 mg of triphenylphosphine, 29 mg of bis(triphenylphosphine)palladium(II) dichloride and 10 mg of copper(I) iodide were dissolved. The obtained liquid was refluxed for 10 hours under nitrogen gas atmosphere, and cooled. After methanol was added, the formed precipitate was collected by filtration and purified through a column chromatograph, to obtain 2.0 g of crystalline B-2D.

(Synthesis of B-2E)

In 30 ml of methanol, 0.6 g of B-2D was dissolved. While nitrogen gas was bubbled, 2 ml of sodium methoxide (28% methanol solution) was added to the solution. After the resulting solution was stirred at room temperature for 1 hour, diluted hydrochloric acid was added. The liquid was then extracted with ethyl acetate. From the obtained organic portion, the solvent was distilled away under reduced pressure to obtain 0.4 g of crystalline B-2E.

(Synthesis of B-2)

In 20 ml of tetrahydrofuran, 5.0 g of 4-octyloxybenzoyl chloride obtained in the known manner and 0.4 g of B-2E were dissolved. To the solution, 3.0 ml of diisopropylethylamine and 0.1 g of dimethylaminopyridine were added. After the obtained liquid was stirred at room temperature for 6 hours, water was added. The resultant liquid was then extracted with $CH_2Cl_2$, and the obtained organic portion was concentrated under reduced pressure and then purified through a column chromatograph to obtain 0.80 g of crystalline B-2. The NMR spectrum of the obtained B-2 was as follows.

$^1$H NMR (solvent: $CDCl_3$, standard: tetramethylsilane) δ (ppm): 0.85-0.95 (12H, m), 1.20-1.60 (40H, m), 1.70-1.90 (8H, m), 3.95-4.10 (8H, m), 6.97 (8H, d), 7.07 (4H, s), 7.25 (2H), 7.33 (2H, d), 7.46 (2H, d), 8.14 (4H, d), 8.20 (4H, d)

The phase transition temperature of the obtained B-2 was determined by observation of texture with a polarizing microscope. As a result, according as the temperature rose, the crystal phase changed into nematic phase at about 168° C. and the isotropic liquid phase appeared above 177° C. In this way, it was confirmed that the compound B-2 forms nematic phase in the temperature range of 168° C. to 177° C.

[Measurement of Wavelength Distribution]

At 185° C., a wedged liquid crystal cell (N-Wedge NLCD-057, Nippo Denki Co., Ltd.) was filled with B-2. The Δn at each wavelength of 450 nm, 550 nm and 650 nm was measured at 170° C., and thereby it was found that Δn(450 nm), Δn(550 nm) and Δn(650 nm) were 0.115, 0.102 and 0.099, respectively. It was, therefore, found that the values Δn(450 nm)/Δn(550 nm) and Δn(650 nm)/Δn(550 nm) were Δn(450 nm)/Δn(550 nm)=1.13 and Δn(650 nm)/Δn(550 nm)-0.97, respectively. These were similar to those of the normal rod-like liquid crystal compound in Comparison example 1.

EXAMPLE 9

(Liquid Crystal Composition Containing Liquid Crystal Compound and Non-Liquid Crystal Compound)

In 0.5 ml of chloroform, 50 mg of G-50 and 0.2 mg of the above additive SH-1 were dissolved. The prepared solution was spread by spin-coating to coat an alignment layer-provided glass plate prepared in Example 11 (described later). The thus-obtained sample was heated on a hot-plate at 230° C., and then placed on a hot-stage (MP200-DMSH, KITAZATO SUPPLY Co., Ltd.) heated at 100° C., and the retardation was measured with a KOBRA-WR (OJI SCIENTIFIC INSTRUMENTS CO., LTD.). Independently, the thickness was measured, and from the obtained values the Δn was calculated. As a result, it was found that Δn(450 nm), Δn(550 nm) and Δn(650 nm) were 0.028, 0.040 and 0.046, respectively. It was, therefore, found that the values Δn(450 nm)/Δn(550 nm) and Δn(650 nm)/Δn(550 nm) were Δn(450 nm)/Δn(550 nm)=0.70 and Δn(650 nm)/Δn(550 nm)=1.15, respectively.

EXAMPLE 10

(Liquid Crystal Composition Containing Liquid Crystal Compound Giving Normal Wavelength Distribution of Δn)

In 0.5 ml of dichloromethane, 100 mg of G-1 (liquid crystal compound of the invention) and 50 mg of B-1 (conventional liquid crystal compound) were dissolved. From the solution, dichloromethane was removed under reduced pressure to prepare a liquid crystal composition (MIX-1). At 260° C., a wedged liquid crystal cell (N-Wedge NLCD-057, Nippo Denki Co., Ltd.) was filled with MIX-1. The Δn at each wavelength of 450 nm, 550 nm and 650 nm was measured when the composition was cooled to form nematic phase, and thereby it was found that Δn(450 nm), Δn(550 nm) and Δn(650 nm) were 0.129, 0.130 and 0.134, respectively. It was, therefore, found that the values Δn(450 nm)/Δn(550 nm) and Δn(650 nm)/Δn(550 nm) were Δn(450 nm)/Δn(550 nm)=0.99 and Δn(650 nm)/Δn(550 nm)=1.03, respectively. These results indicate that a liquid crystal composition containing the liquid crystal compound of the invention, which gives inverse wavelength distribution of Δn, and a liquid crystal compound giving normal wavelength distribution realizes intermediate wavelength distribution of Δn.

EXAMPLE 11

Production of Phase Retarder (Formation of Alignment Layer)

The polyimide alignment material (SE-150, Nissan Chemicals Co., Ltd.) was diluted with γ-butyrolactone, and spread to coat a glass plate. After dried at 80° C. for 15 minutes, the spread liquid was further dried at 250° C. for 60 minutes. The formed layer was cooled, and subjected to the rubbing treatment. In this way, an alignment layer having 0.1 μm thickness was formed on a glass plate.

(Formation of Optically Anisotropic Layer)

The above-formed alignment layer was coated with G-1 dissolved in dichloromethane, and then heated on a metallic surface of a hot plate at about 220° C. The sample was observed through a polarizing microscope, and the retardation was measured according to the Senarmont method. It was thus confirmed that molecules of G-1 are evenly aligned and that the retardation at 546 nm was about λ/4 (about 136 nm). Further, the metallic surface of hot plate was observed through the sample and a polarizing plate.

COMPARISON EXAMPLE 3

The above-formed alignment layer was coated with B-1 dissolved in dichloromethane, and then heated on a metallic surface of a hot plate at about 150° C. The sample was observed through a polarizing microscope, and the retardation was measured according to the Senarmont method. It was thus confirmed that molecules of B-1 are evenly aligned and that the retardation at 546 nm was about λ/4 (about 136 nm). Further, the metallic surface of hot plate was observed through the sample and a polarizing plate.

The metallic surface seen through the polarizing plate and the phase retarder of Example 11 appeared darker and less colored than that seen through the polarizing plate and the phase retarder of Comparison Example 3. This means that the compound G-1 can be more advantageously used in a λ/4 plate.

EXAMPLE 12

(Phase Retarder Prepared from Polymerizable Liquid Crystal Compound)

In 0.5 ml of chloroform, 100 mg of G-2 (liquid crystal compound of the invention), 3 mg of a photopolymerization initiator (Irgacure 907, Ciba-Geigy), 1 mg of a sensitizer (Kayacure DETX, Nippon Kayaku Co., Ltd.) and 0.4 mg of the above additive SH-1 were dissolved. The solution was spread in the above manner to form a layer, and then heated at 200° C. so that molecules of G-2 might be aligned. The layer was then exposed to ultraviolet light in the amount of 400 mJ/cm² to fix the alignment, and cooled to room temperature to prepare an optically anisotropic layer having about 1.40 μm thickness. Thus, a phase retarder was produced. The retardation of the phase retarder was measured with a KOBRA-WR (OJI SCIENTIFIC INSTRUMENTS CO., LTD.). Independently, the thickness was measured, and from the obtained values the Δn was calculated. As a result, it was found that Δn(450 nm), Δn(550 nm) and Δn(650 nm) were 0.061, 0.067 and 0.070, respectively. It was, therefore, found that the values Δn(450 nm)/Δn(550 nm) and Δn(650 nm)/Δn(550 nm) were Δn(450 nm)/Δn(550 nm)=0.91 and Δn(650 nm)/Δn(550 nm)=1.04, respectively. These results indicate that the polymerized compound of the invention gave almost the same wavelength distribution as the compound of Example 2, which was not polymerized. Accordingly, it was confirmed that, even if the liquid crystal compound of the invention (which gives inverse wavelength distribution when not polymerized) is photo-polymerized to form an optically anisotropic layer, the formed layer still gave the inverse wavelength distribution.

The invention claimed is:

1. A compound represented by the following formula (III):

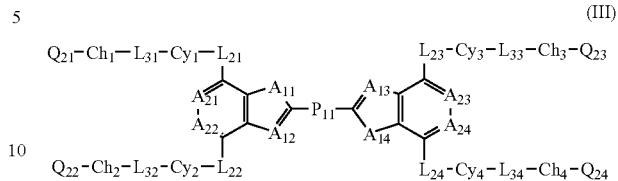

(III)

in which each of $A_{11}$ and $A_{14}$ is independently —O—, —NR—, —S—, —CR$_2$—, or —CO—, wherein R is hydrogen or an alkyl group having 1 to 10 carbon atoms; each of $A_{12}, A_{13}, A_{21}, A_{22}, A_{23}$ and $A_{24}$ is independently —CR= or —N=, wherein R is hydrogen or an alkyl group having 1 to 10 carbon atoms; $P_{11}$ is a single bond or a divalent linking group selected from the group consisting of —C≡C—, 1,4-phenylene that can be substituted with an alkyl group having 1 to 10 carbon atoms; each of $L_{21}, L_{22}, L_{23}$ and $L_{24}$ is independently a single bond or a divalent linking group; each of $Cy_1, Cy_2, Cy_3$ and $Cy_4$ is independently a divalent cyclic group having at least one aromatic, aliphatic or heterocyclic ring; each of $L_{31}, L_{32}, L_{33}$ and $L_{34}$ is independently a single bond or a divalent linking group; each of $Ch_1, Ch_2, Ch_3$ and $Ch_4$ is independently an alkylene group; and each of $Q_{21}, Q_{22}, Q_{23}$, and $Q_{24}$ is independently hydrogen or a polymerizable group, provided that each of $A_{11}$ and $A_{14}$ is —S—, each of $L_{21}, L_{22}, L_{23}$ and $L_{24}$ is —O—CO— or —CO—O—.

2. The compound of claim 1, wherein the compound is a liquid crystal compound forming nematic phase or smectic A phase, and wherein the liquid crystal phase satisfies the following formula (II):

$$\Delta n(450\ nm)/\Delta n(550\ nm)<1.0 \quad (II)$$

in which Δn(λ) means the specific birefringent index at the wavelength λ in the liquid crystal phase.

3. A liquid crystal composition containing the compound of claim 1.

4. A liquid crystal composition containing the compound of claim 1 and at least one liquid crystal compound giving normal wavelength distribution of Δn.

5. A phase retarder comprising a transparent support and at least one optically anisotropic layer provided thereon, wherein the optically anisotropic layer is formed from the compound of claim 1.

6. An elliptically polarizing plate comprising the phase retarder of claim 5 and a polarizing membrane.

7. A polymer prepared from the compound of claim 1.

8. The compound of claim 1, wherein each of $L_{21}, L_{22}, L_{23}$ and $L_{24}$ is —O—CO— or —CO—O—.

9. The compound of claim 1, wherein each of $A_{11}$ and $A_{14}$ is independently —O—, —NR—, —CR$_2$—, or —CO—.

10. The compound of claim 1, wherein each of $A_{11}$ and $A_{14}$ is —O—.

* * * * *